US012745304B2

(12) United States Patent
Regev et al.

(10) Patent No.: US 12,745,304 B2
(45) Date of Patent: Sep. 22, 2026

(54) ALTERNATIVE BEAM FAILURE PROCEDURES FOR PREDICTED BEAM BLOCKAGE

(71) Applicant: QUALCOMM Incorporated, San Diego, CA (US)

(72) Inventors: Aviv Regev, Tel Aviv (IL); Shay Landis, Hod Hasharon (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 18/469,438

(22) Filed: Sep. 18, 2023

(65) Prior Publication Data

US 2025/0098009 A1 Mar. 20, 2025

(51) Int. Cl.

| | |
|---|---|
| ***H04W 24/04*** | (2009.01) |
| ***H04W 72/044*** | (2023.01) |
| ***H04W 72/21*** | (2023.01) |
| ***H04W 72/231*** | (2023.01) |
| ***H04W 76/19*** | (2018.01) |

(52) U.S. Cl.

CPC ........... *H04W 76/19* (2018.02); *H04W 24/04* (2013.01); *H04W 72/044* (2013.01); *H04W 72/21* (2023.01); *H04W 72/231* (2023.01)

(58) Field of Classification Search

CPC ... H04W 24/04; H04W 72/044; H04W 72/21; H04W 72/231; H04W 76/19

See application file for complete search history.

(56) References Cited

U.S. PATENT DOCUMENTS

| | | | | |
|---|---|---|---|---|
| 10,135,562 | B2 * | 11/2018 | Zhang | H04L 1/0025 |
| 2009/0243912 | A1 * | 10/2009 | Lohmeier | G01S 13/931 342/70 |
| 2015/0177371 | A1 * | 6/2015 | Abbasi | G01S 13/88 342/174 |
| 2016/0007332 | A1 * | 1/2016 | Futaki | H04L 5/0098 370/329 |
| 2017/0074980 | A1 * | 3/2017 | Adib | G01S 13/878 |

(Continued)

OTHER PUBLICATIONS

Alrabeiah, M., Hredzak, A., and Alkhateeb, A., "Millimeter Wave Base Stations with Cameras: Vision Aided Beam and Blockage Prediction," May 2020, In Proceedings of the 2020 IEEE 91st Vehicular Technology Conference (VTC2020—Spring), pp. 1-5.*

*Primary Examiner* — Sam Bhattacharya

(74) *Attorney, Agent, or Firm* — Holland & Hart LLP

(57) ABSTRACT

Methods, systems, and devices for wireless communications are described. A network entity may receive a first control message including an indication of a first beam from a plurality of beams from a user equipment (UE) for communicating with the UE. The network entity may receive one or more signals associated with an object that has a trajectory that is predicted to interfere with the first beam. Based on receiving the one or more signals, the network entity may determine that the object will block the first beam. The network entity may transmit a second control message to the UE indicating a time duration that the object will interfere with the first beam and one or more communication parameters associated with the time duration. The UE may apply the one or more communication parameters during the time duration based on receiving the signal from the network entity.

30 Claims, 16 Drawing Sheets

(56) References Cited

U.S. PATENT DOCUMENTS

| | | | | |
|---|---|---|---|---|
| 2020/0300996 | A1* | 9/2020 | Cetinoneri | G01S 7/006 |
| 2020/0351946 | A1* | 11/2020 | Pang | H04W 74/006 |
| 2021/0159919 | A1* | 5/2021 | Liau | H04L 1/0001 |
| 2022/0052738 | A1* | 2/2022 | Wang | H04B 7/0408 |
| 2022/0158715 | A1* | 5/2022 | Bishwarup | H04W 72/23 |
| 2022/0217616 | A1* | 7/2022 | Wu | H04W 74/002 |
| 2022/0263590 | A1* | 8/2022 | Koo | H04B 17/309 |
| 2023/0038022 | A1* | 2/2023 | Chen | H04W 48/08 |
| 2023/0354124 | A1* | 11/2023 | Sambhwani | H04W 36/00835 |
| 2024/0015741 | A1* | 1/2024 | Tsai | H04L 25/0204 |

* cited by examiner

ALTERNATIVE BEAM FAILURE PROCEDURES FOR PREDICTED BEAM BLOCKAGE

TECHNICAL FIELD

The following relates to wireless communications, including alternative beam failure procedures for predicted beam blockage.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

SUMMARY

The described techniques relate to improved methods, systems, devices, and apparatuses that support alternative beam failure procedures for predicted beam blockage. For example, the described techniques provide for a network entity receiving a first control message including an indication of a first beam from a plurality of beams from a user equipment (UE) for communicating with the UE. The network entity may receive one or more signals associated with an object that has a trajectory that is predicted to interfere with the first beam. For example, the network entity may receive the one or more signals as a part of a sensing operation. Based on receiving the one or more signals, the network entity may determine that the object will block the first beam. The network entity may transmit a second control message to the UE indicating a time duration that the object will interfere with the first beam and one or more communication parameters associated with the time duration. The UE may apply the one or more communication parameters during the time duration based on receiving the signal from the network entity.

A method for wireless communications by a network entity is described. The method may include receiving, from a UE, a first control message indicating a first beam from a set of multiple available beams, the first beam for downlink communication with the UE, receiving one or more signals associated with an object having a trajectory that is predicted to at least partially block the first beam, and transmitting, to the UE, a second control message indicating a time duration that the object is estimated to at least partially block the first beam and an adjustment to one or more communication parameters associated with the time duration.

A network entity for wireless communications is described. The network entity may include one or more memories storing processor executable code, and one or more processors coupled with the one or more memories. The one or more processors may individually or collectively operable to execute the code (e.g., directly, indirectly, after pre-processing, without pre-processing) to cause the network entity to receive, from a UE, a first control message indicating a first beam from a set of multiple available beams, the first beam for downlink communication with the UE, receive one or more signals associated with an object having a trajectory that is predicted to at least partially block the first beam, and transmit, to the UE, a second control message indicating a time duration that the object is estimated to at least partially block the first beam and an adjustment to one or more communication parameters associated with the time duration.

Another network entity for wireless communications is described. The network entity may include means for receiving, from a UE, a first control message indicating a first beam from a set of multiple available beams, the first beam for downlink communication with the UE, means for receiving one or more signals associated with an object having a trajectory that is predicted to at least partially block the first beam, and means for transmitting, to the UE, a second control message indicating a time duration that the object is estimated to at least partially block the first beam and an adjustment to one or more communication parameters associated with the time duration.

A non-transitory computer-readable medium storing code for wireless communications is described. The code may include instructions executable by a processor (e.g., directly, indirectly, after pre-processing, without pre-processing) to receive, from a UE, a first control message indicating a first beam from a set of multiple available beams, the first beam for downlink communication with the UE, receive one or more signals associated with an object having a trajectory that is predicted to at least partially block the first beam, and transmit, to the UE, a second control message indicating a time duration that the object is estimated to at least partially block the first beam and an adjustment to one or more communication parameters associated with the time duration.

Some examples of the method, network entities, and non-transitory computer-readable medium described herein may further include operations, features, means, or instructions for transmitting, during the time duration, one or more messages to the UE in accordance with the adjustment to the one or more communication parameters.

In some examples of the method, network entities, and non-transitory computer-readable medium described herein, the adjustment to the one or more communication parameters may be to change from a first beam index of the first beam to a second beam index of a second beam that may be different from the first beam, and where the one or more messages may be transmitted via the second beam.

In some examples of the method, network entities, and non-transitory computer-readable medium described herein, the adjustment to the one or more communication parameters may be to change from a first modulation and coding scheme (MCS) to a second MCS, and where the one or more messages may be transmitted in accordance with the second MCS.

Some examples of the method, network entities, and non-transitory computer-readable medium described herein may further include operations, features, means, or instructions for transmitting one or more reference signals via one or more beams and monitoring for one or more reflections of the one or more reference signals for identifying the object.

In some examples of the method, network entities, and non-transitory computer-readable medium described herein, the trajectory of the object may be predicted based on the one or more reflections of the one or more reference signals.

In some examples of the method, network entities, and non-transitory computer-readable medium described herein, the time duration that the object may be estimated to at least partially block the first beam may be based on the one or more reflections of the one or more reference signals.

In some examples of the method, network entities, and non-transitory computer-readable medium described herein, the adjustment to the one or more communication parameters may be based on the one or more reflections of the one or more reference signals.

Some examples of the method, network entities, and non-transitory computer-readable medium described herein may further include operations, features, means, or instructions for transmitting a request for the UE to perform one or more signal measurements associated with the first beam during the time duration, transmitting, via the first beam, one or more signals during the time duration, and receiving, from the UE, a report indicating the one or more signal measurements.

In some examples of the method, network entities, and non-transitory computer-readable medium described herein, the adjustment to one or more communication parameters associated with the time duration indicates that data transmission with the UE may be paused during at least a portion of the time duration.

Some examples of the method, network entities, and non-transitory computer-readable medium described herein may further include operations, features, means, or instructions for transmitting, to the UE, an indication to stop applying the adjustment to the one or more communication parameters subsequent to transmission of the second control message.

Some examples of the method, network entities, and non-transitory computer-readable medium described herein may further include operations, features, means, or instructions for transmitting the second control message via a physical downlink control channel (PDCCH), a medium access control-control element (MAC-CE), or both.

A method for wireless communications by a UE is described. The method may include transmitting, to a network entity, a first control message indicating a first beam from a set of multiple available beams, the first beam for downlink communication with the network entity, receiving, from the network entity, a second control message indicating a time duration that an object is estimated to at least partially block the first beam and an adjustment to one or more communication parameters associated with the time duration, and communicating with the network entity based on the second control message.

A UE for wireless communications is described. The UE may include one or more memories storing processor executable code, and one or more processors coupled with the one or more memories. The one or more processors may individually or collectively operable to execute the code (e.g., directly, indirectly, after pre-processing, without pre-processing) to cause the UE to transmit, to a network entity, a first control message indicating a first beam from a set of multiple available beams, the first beam for downlink communication with the network entity, receive, from the network entity, a second control message indicating a time duration that an object is estimated to at least partially block the first beam and an adjustment to one or more communication parameters associated with the time duration, and communicate with the network entity based on the second control message.

Another UE for wireless communications is described. The UE may include means for transmitting, to a network entity, a first control message indicating a first beam from a set of multiple available beams, the first beam for downlink communication with the network entity, means for receiving, from the network entity, a second control message indicating a time duration that an object is estimated to at least partially block the first beam and an adjustment to one or more communication parameters associated with the time duration, and means for communicating with the network entity based on the second control message.

A non-transitory computer-readable medium storing code for wireless communications is described. The code may include instructions executable by a processor (e.g., directly, indirectly, after pre-processing, without pre-processing) to transmit, to a network entity, a first control message indicating a first beam from a set of multiple available beams, the first beam for downlink communication with the network entity, receive, from the network entity, a second control message indicating a time duration that an object is estimated to at least partially block the first beam and an adjustment to one or more communication parameters associated with the time duration, and communicate with the network entity based on the second control message.

Some examples of the method, UEs, and non-transitory computer-readable medium described herein may further include operations, features, means, or instructions for receiving, during the time duration, one or more messages from the network entity in accordance with the adjustment to the one or more communication parameters.

In some examples of the method, UEs, and non-transitory computer-readable medium described herein, the adjustment to the one or more communication parameters may be to change from a first beam index of the first beam to a second beam index of a second beam that may be different from the first beam, and where the one or more messages may be received via the second beam.

Some examples of the method, UEs, and non-transitory computer-readable medium described herein may further include operations, features, means, or instructions for performing one or more signal measurements of the set of multiple available beams and selecting a second beam for receiving one or more messages from the network entity during the time duration based on the one or more signal measurements and the second control message.

In some examples of the method, UEs, and non-transitory computer-readable medium described herein, the adjustment to the one or more communication parameters may be to change from a first MCS to a second MCS, and where the one or more messages may be received in accordance with the second MCS.

Some examples of the method, UEs, and non-transitory computer-readable medium described herein may further include operations, features, means, or instructions for applying the adjustment to the one or more communication parameters during the time duration and stopping applying the adjustment to the one or more communication parameters based on an indication from the network entity, a configuration from the network entity, expiration of the time duration, or any combination thereof.

In some examples of the method, UEs, and non-transitory computer-readable medium described herein, communicating with the network entity may include operations, features, means, or instructions for receiving, from the network entity, a request for the UE to perform one or more signal measurements associated with the first beam during the time duration, performing the one or more signal measurements on one or more signals transmitted from the network entity during the time duration, and transmitting, to the network entity, a report indicating the one or more signal measurements.

Some examples of the method, UEs, and non-transitory computer-readable medium described herein may further include operations, features, means, or instructions for entering a sleep state during a remainder of the time duration subsequent to transmitting the report based on failing to receive a message from the network entity responsive to the report.

In some examples of the method, UEs, and non-transitory computer-readable medium described herein, the adjustment to one or more communication parameters associated with the time duration indicates that data transmission with the network entity may be paused during at least a portion of the time duration.

In some examples of the method, UEs, and non-transitory computer-readable medium described herein, communicating with the network entity may include operations, features, means, or instructions for entering a sleep state during the portion of the time duration based on the second control message.

DETAILED DESCRIPTION

Figure 1:
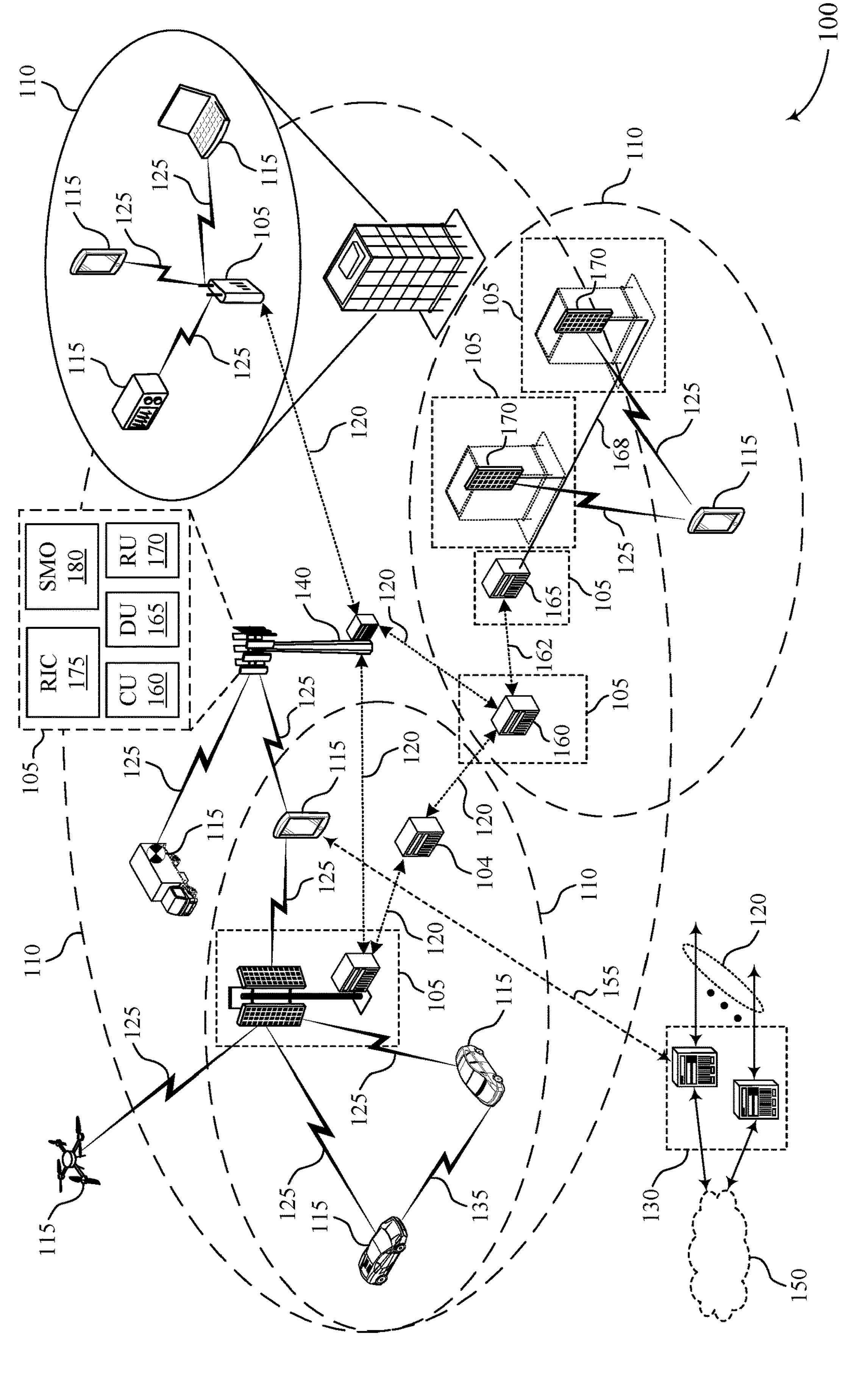
FIG. 1 shows an example of a wireless communications system that supports alternative beam failure procedures for predicted beam blockage in accordance with one or more aspects of the present disclosure.

In some wireless communications systems, a user equipment (UE) may communicate with a network entity via one or more beams (e.g., spatial beams). In some examples, the UE may perform measurements on one or more signals (e.g., reference signals) transmitted from the network entity via the beams, and may report the results (e.g., a reference signal reserved power (RSRP), a reference signal reserved quality (RSRQ)) to the network entity for one or more of the beams (e.g., a list of one or more beams and corresponding measurements for each beam). The network entity may select a beam (e.g., a downlink beam) based on the report and may communicate data with the UE via the beam. However, in some cases, an object (e.g., a vehicle, a pedestrian) may move in a direction to block the beam, which may cause signal degradation or link failure. In such cases, the UE may perform a beam failure procedure based on determining that the link has failed for a period of time, which may introduce signaling overhead and may increase power consumption at the UE.

Various aspects of the present disclosure are related to alternate beam failure procedures for predicted beam blockage. A UE may monitor a plurality of beams and report one or more beams (e.g., one or more beams with a highest RSRP or that satisfy an RSRP threshold) to a network entity, and the network entity may communicate with the UE via a first beam of the plurality of beams (e.g., pick the beam with the highest RSRP). In some examples, the network entity may perform a sensing operation to detect one or more objects that moving within a coverage area and are predicted to interfere with the first beam at some point in the future. For example, the network entity may transmit a signal (e.g., a sensing reference signal) via one or more beams. In some examples, the signal may be reflected back to the network entity by an object. Based on receiving the reflected signal, the network entity may determine the trajectory of the object and may predict that the object will block the first beam at some point in the future or is currently blocking the first beam. The network entity may transmit a signal to the UE indicating a time duration that the object is predicted to block the first beam and indicating an adjustment of one or more communication parameters associated with the time duration (e.g., indicate a change to beam index identifying a second beam for use before, after, or during the time duration, indicate a change to a modulation and coding scheme (MCS) for use before, after, or during the time duration, or a indicate that traffic between the network entity and the UE is paused before, after, or during the time duration, or any combination thereof). The UE may apply the one or more communication parameters during the time duration based on receiving the signal from the network entity.

Aspects of the disclosure are initially described in the context of wireless communications systems. Aspects of the disclosure are additionally described in the context of process flows. Aspects of the disclosure are further illustrated by and described with reference to apparatus diagrams, system diagrams, and flowcharts that relate to alternative beam failure procedures for predicted beam blockage.

FIG. 1 shows an example of a wireless communications system 100 that supports alternative beam failure procedures for predicted beam blockage in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support alternative beam failure procedures for predicted beam blockage as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term “cell” may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, a UE 115 may indicate a plurality of available beams to a network entity 105, and the network entity 105 may communicate with the UE 115 via a first beam of the plurality of beams. In some examples, the network entity 105 may perform a sensing operation to detect an object that is predicted to interfere (e.g., spatially) with the first beam. For example, the network entity 105 may transmit a signal (e.g., a reference signal) via one or more neighboring beams to the first beam. In some examples, the object may reflect the signal back to the network entity 105, and based on receiving the reflected signal, the network entity 105 may estimate a trajectory of the object to determine that the object will block the first beam. The network entity 105 may predict a time duration that the object will interfere with the first beam and may indicate the time duration and an adjustment to one or more communication parameters associated with the time duration (e.g., paused traffic between the network entity 105 and the UE 115 during the blockage) in a first message to the UE 115. The one or more communication parameters may include a change a beam index to a second beam, change to a second MCS, or both.

The UE 115 may apply the one or more communication parameters during the time duration based on receiving the first message from the network entity 105 and may communicate with the network entity 105 during the time duration according to the adjusted one or more communication parameters. For example, the UE 115 may communicate with the network entity 105 using the second beam and the second MCS or may communicate with the network entity 105 using the first beam and the second MCS. Additionally, or alternatively, the UE 115 may enter a sleep state for the time duration based on receiving the first message from the network entity 105. After the time duration, the network entity 105 may transmit a second message to the UE 115 indicating to stop applying the adjustment to the one or more communication parameters.

Figure 2:
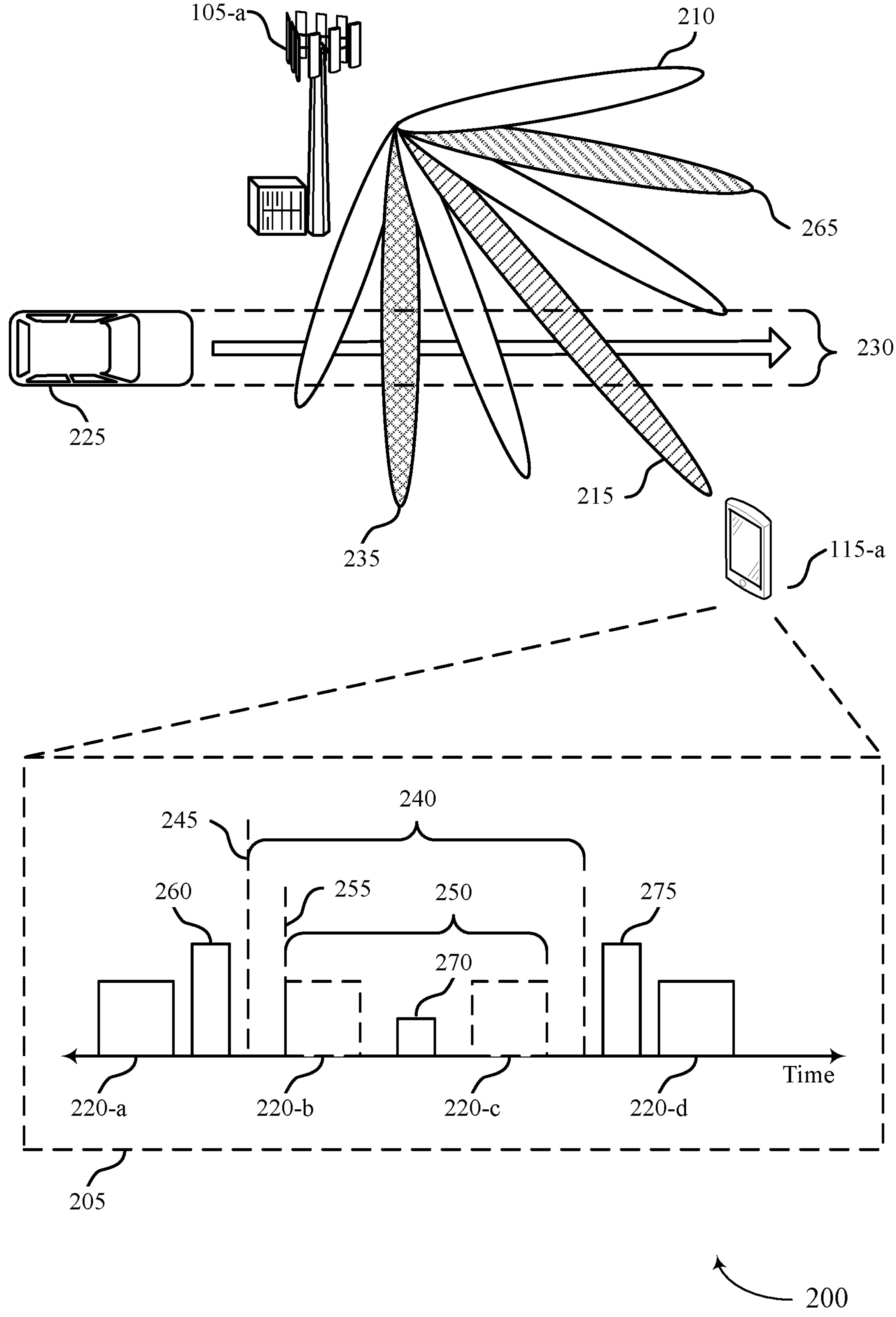
FIG. 2 shows an example of a wireless communications system that supports alternative beam failure procedures for predicted beam blockage in accordance with one or more aspects of the present disclosure.

FIG. 2 shows an example of a wireless communications system 200 that supports alternative beam failure procedures for predicted beam blockage in accordance with one or more aspects of the present disclosure. The wireless communications system 200 may illustrate an example for implementing one or more aspects of the wireless communications steam 100. The wireless communications system 200 may include a UE 115-*a* and a network entity 105-*a*, which may be examples of corresponding devices as described herein, including with respect to FIG. 1. FIG. 2 also includes a communications timeline 205 of the UE 115-*a*. In some examples, the horizontal axis of the communications timeline 205 may represent a time component of communications between the UE 115-*a* and the network entity 105-*a*.

The UE 115-*a* and the network entity 105-*a* may communicate via one or more beams 210 (e.g., spatial beams). In some examples, the UE 115-*a* may perform measurements on one or more signals (e.g., reference signals) transmitted from the network entity 105-*a* via one or more respective beams 210. For example, the UE 115-*a* may measure a RSRP, a RSRQ, a SNR, or any combination thereof. Based on performing the measurements on the one or more beams 210, the UE 115-*a* may select one or more beams 210 for communicating with the network entity 105-*a* (e.g., based on one or more measurements satisfying a threshold) and may indicate the one or more beams 210 to the network entity 105-*a*. In some examples, the UE 115-*a* may indicate the one or more beams 210 via uplink signaling (e.g., via a first control message transmitted to the network entity 105-*a*). For example, the UE 115-*a* may indicate the one or more beams 210 in a channel state feedback (CSF) report to the network entity 105-*a*.

Based on receiving the indication from the UE 115-*a*, the network entity 105-*a* may select a first beam 215 (e.g., best beam with a highest RSRP) from the one or more beams 210. The network entity 105-*a* may select the first beam 215 based on one or more criteria, including a highest RSRP, RSRQ, SNR, or any combination thereof relative to the other beams 210 of the one or more beams 210, one or more system requirements, or any combination thereof. In some examples, the first beam 215 is a downlink beam, and the network entity 105-*a* may communicate network traffic 220 (including network traffic 220-*a*, network traffic 220-*b*, network traffic 220-*c*, and network traffic 220-*d*) with the UE 115-*a* via the first beam 215. The UE 115-*a* may periodically perform the measurements on reference signals transmitted from the network entity 105-*a* to select the first beam 215 over time.

In some implementations, an object 225 (e.g., a vehicle, a pedestrian) may block (e.g., interfere with) a beam 210 (e.g., a downlink beam over a downlink connection). For example, a trajectory 230 associated with the object 225 may coincide with a beam 210 (e.g., in space), and the object 225 may be in between the UE 115-*a* and the network entity 105-*a*. In such examples, one or more characteristics (e.g., a link performance, a signal quality) of the beam 210 may degrade. For example, the network entity 105-*a* and the UE 115-*a* may communicate over a high frequency band (e.g., millimeter-wave (mmW), sub-terahertz (sub-THz)), and a blockage caused by the object 225 may cause a radio link failure between the UE 115-*a* and the network entity 105-*a* over the beam 210. Accordingly, a blockage caused by the object 225 may interrupt network traffic 220-*a*, network traffic 220-*b*, network traffic 220-*c*, and network traffic 220-*d* between the network entity 105-*a* and the UE 115-*a*.

In some examples, the network entity 105-*a* may perform a sensing operation to predict that the object 225 is likely to block the first beam 215. In some examples, the network entity 105-*a* may use one or more beams 210 in addition to or different from the first beam 215 to search for the object 225 (e.g., search for one or more potentially blocking objects within spatial area associated with one or more communication links and corresponding beams). For example, the network entity 105-*a* may transmit one or more pilot signals (e.g., a reference signal, a sensing reference signal) over a neighboring beam 235. In some examples, the object 225 may reflect the pilot signal. The network entity 105-*a* may monitor for (e.g., detect) the reflected pilot signal and based on receiving the reflected pilot signal, may predict that the object 225 is likely to block the first beam 215. The rate at which the network entity 105-*a* transmits the reference signals, monitors for the reference signals, or both may depend on one or more criteria, including a capability of the wireless communications system 200, one or more requirements (e.g., system needs) of the wireless communications system 200, mobility of the UE 115-*a*, or any combination thereof. In some examples, the network entity 105-*a* may predict, based on the trajectory 230 of the object 225, a time duration 240 of the blockage caused by the object 225 and a start time 245 of the time duration 240 (e.g., predict when and how long a blockage of the serving beam will occur).

Based on determining that the object 225 is likely to block the first beam 215 for the time duration 240, the network entity 105-*a* may determine an adjustment to one or more communication parameters associated with communications between the network entity 105-*a* and the UE 115-*a*. In some examples, the one or more communication parameters may include a beam index, a MCS, a second time duration 250 associated with paused traffic between the network entity 105-*a* and the UE 115-*a*, a second start time 255 of the second time duration 250, or any combination thereof. The network entity 105-*a* may transmit a control message 260 (e.g., a second control message) indicating the time duration 240, the start time 245, the adjustment to the one or more communication parameters, or any combination thereof, to the UE 115-*a* (e.g., before the time duration 240). In some examples, the network entity 105-*a* may transmit the control message 260 via downlink signaling at the physical layer (e.g., a physical downlink control channel (PDCCH), a medium access control-control element (MAC-CE)).

For example, based on determining that the object 225 is likely to block the first beam 215 during the time duration 240, the network entity 105-*a* may select an alternative beam 265 that is different from the first beam 210 for communicating with the UE 115-*a* during the time duration 240. In some examples, the network entity 105-*a* may select the alternative beam 265 from the available one or more beams 210 indicated to the network entity 105-*a* by the UE 115-*a* (e.g., in the CSF report during initial beam management). In such examples, the alternative beam 265 may be a second-best beam relative to the first beam 215 according to one or more criteria (e.g., signal measurements). Additionally, or alternatively, the network entity 105-*a* may select a lower-order MCS relative to the MCS associated with the first beam 215 (e.g., reduce MCS during the time duration 240). The network entity 105-*a* may include the beam index of the alternative beam 265, the lower-order MCS, or both in the control message 260. In some examples, the network entity 105-*a* may include the beam index of the alternative beam 265 to assist the UE 115-*a* in searching for a new best downlink beam 210 for communicating with the network entity after the time duration 240. In some examples the network entity 105 may indicate in the control message 260 a different interim uplink and downlink beam pair to use for communications during the time duration 240.

In some other examples, the UE 115-*a* may not indicate an alternative beam 265 in the CSF report. In such examples, the network entity 105-*a* may transmit a request to the UE 115-*a* to perform measurements on the current serving beam (e.g., the first beam 215) during the time duration 240 (e.g., once blockage starts). The network entity 105-*a* may receive a second (e.g., updated) CSF report from the UE 115-*a*, and based on the measurements included in the updated CSF report (e.g., the RSRP, the RSRQ, the SNR, or any combination thereof), the network entity 105-*a* may determine whether to continue communicating with the UE 115-*a* via the first beam 215 or to change to a different beam. For example, the updated CSF report may indicate that the observed measurements may be relatively similar (e.g., the blockage was not too severe) relative to the initial measurements for the beam 215. Accordingly, the network entity 105-*a* may determine that the downlink connection between the network entity 105-*a* and the UE 115-*a* has not fully degraded and may continue communicating with the UE 115-*a* via the first beam 215 but may adjust a communication parameter, such as to use a lower MCS as compared to a previously used MCS, and may transmit a response 270 to the UE 115-*a* during the time duration 240 indicating the lower MCS. In some cases, if the UE 115-*a* doesn't receive a reply within some time window after sending the updated CSF report, the UE 115-*a* may go to sleep for a duration of blockage.

In yet some other examples, the network entity 105-*a* may stop (e.g., pause) some or all of the network traffic 220-*a*, network traffic 220-*b*, network traffic 220-*c*, and network traffic 220-*d* between the network entity 105-*a* and the UE 115-*a* during the time duration 240. For example, the control message 260 may indicate that traffic is being halted during the time duration 240 or during a second time duration 250. In such other examples, the network entity 105-*a* may determine the second time duration 250 in which traffic is paused and the second start time 255 of the second time duration 250 based on the trajectory 230 of the object 225. The network entity 105-*a* may include the second time duration 250, the second start time 255, or both in the control message 260.

The UE 115-*a* may receive the information included in the control message 260 (e.g., the time duration 240, the start time 245, the adjustment to the one or more communication parameters, or any combination thereof) and may use the information when performing demodulation. For example, based on receiving the control message 260, the UE 115-*a* may apply the adjustment to the one or more communication parameters during the time duration 240. In some examples, the UE 115-*a* may communicate network traffic 220-*a* with the network entity 105-*a* before the time duration 240 using the one or more communication parameters (e.g., the first beam 215) and may communicate network traffic 220-*b* and network traffic 220-*c* with the network entity 105-*a* during the time duration 240 using the adjusted one or more communication parameters. Based on receiving the control message 260, the UE 115-*a* may refrain from performing a beam failure procedure during the time duration 240, which may save power at the UE 115-*a* and reduce latency and signaling overhead between the UE 115-*a* and the network entity 105-*a*.

For example, based on receiving the control message 260 including the beam index for the alternative beam 265, the UE 115-*a* may communicate network traffic 220-*b* and network traffic 220-*c* with the network entity 105-*a* using the alternative beam 265. Additionally, based on receiving the beam index for the alternative beam 265, the UE 115-*a* may perform measurements to determine an updated best beam 215 for uplink communications for downlink communications with the network entity 105-*a* and an updated best beam 215 for downlink communications with the network entity 105-*a*. Additionally, or alternatively, based on receiving the receiving the control message 260 including the lower-order MCS, the UE 115-*a* may communicate network traffic 220-*b* with the network entity 105-*a* using the lower-order MCS. The UE 115-*a* may reconfigure the UE 115-*a* accordingly based on the lower-order MCS indicated in the control message 260. In some examples, based on failing to receive a beam index for the alternative beam 265, the UE 115-*a* may communicate network traffic 220-*b* with the network entity 105-*a* via the best beam 215. In some examples, based on receiving the response 270, the UE 115-*a* may communicate network traffic 220-*c* with the network entity 105-*a* via the best beam 215 using the lower-order MCS. In some other examples, based on failing to receive the response 270 within a time period (e.g., during the time duration 240), the UE 115-*a* may enter a sleep state for the remainder of the time duration 240 (or longer) and may not communicate network traffic 220-*c* with the network entity 105-*a*.

Additionally, or alternatively, based on receiving the control message 260 including the second time duration 250 associated with paused traffic between the network entity 105-*a* and the UE 115-*a*, the second start time 255, or both, the UE 115-*a* may determine to enter a sleep state starting from the second start time 255 and may not communicate network traffic 220-*b* or network traffic 220-*c* with the network entity 105-*a*. In some examples, the UE 115-*a* may exit the sleep state after the time duration 240 based on a configuration transmitted by the network entity 115-*a* (e.g., RRC signaling). In some other examples, the UE 115-*a* may exit the sleep state based on receiving a second message 275 from the network entity 105-*a*. In an example, the network entity 105-*a* transmit control signaling (e.g., RRC signaling) to configure the UE 115-*a* to return by default to a previous setting before the blockage (e.g., setting for one or more parameters used prior to the time duration 240).

After the time duration 240, the network entity 105-*a* may transmit a second message 275 to the UE 115-*a* indicating that the network entity 105-*a* is returning to a normal mode (e.g., a non-predicted blockage mode). Based on receiving the second message 275, the UE 115-*a* may stop applying the adjustment to the one or more communication parameters. For example, the UE 115-*a* may communicate network traffic 220-*d* with the network entity 105-*a* after the time duration 240 using the best beam 215. In some examples where the UE enters a sleep state due to receiving the second time duration 250, the UE 115-*a* may exit the sleep state based on receiving the second message 275.

Figure 3:
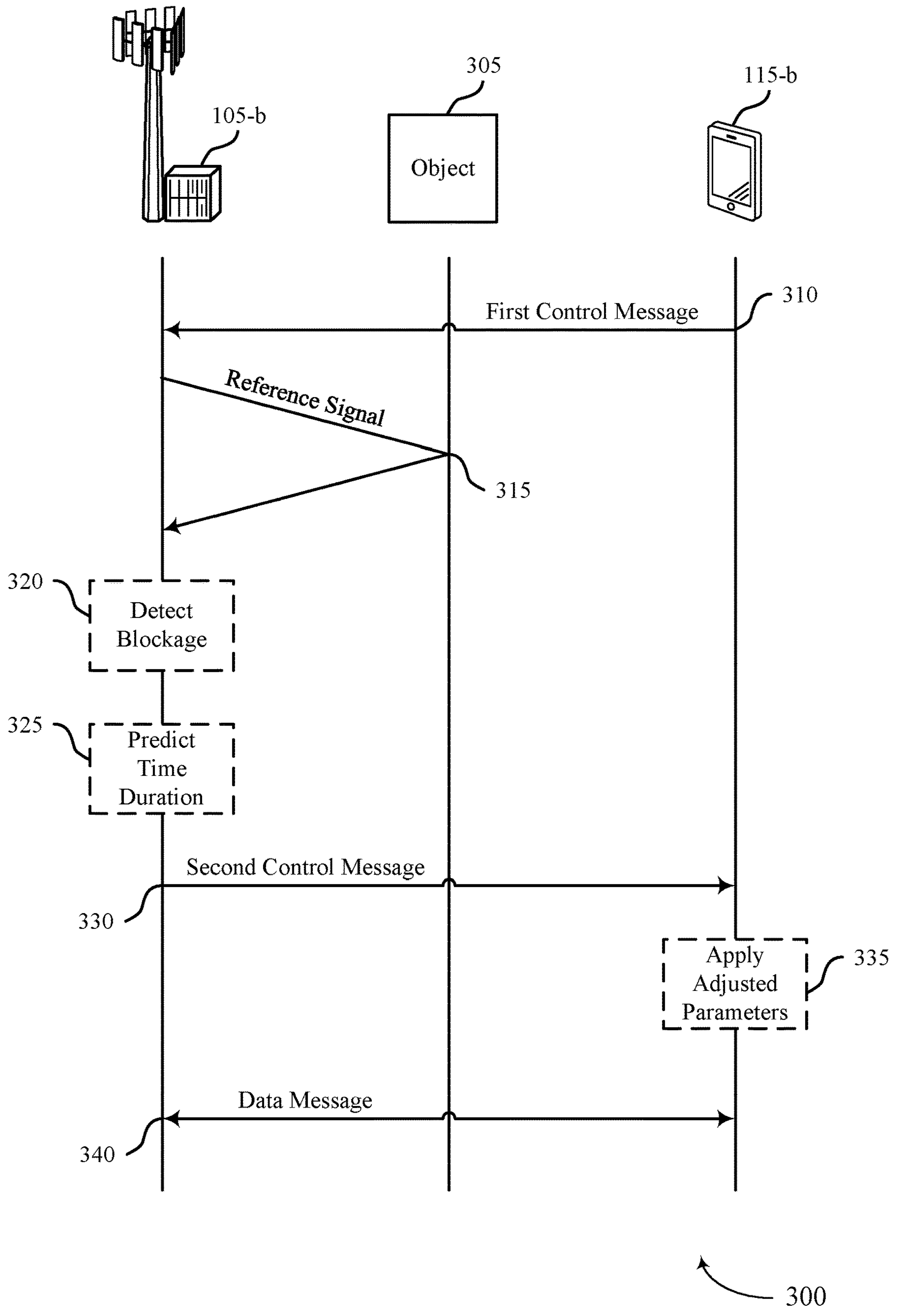
FIG. 3 shows an example of a process flow that supports alternative beam failure procedures for predicted beam blockage in accordance with one or more aspects of the present disclosure.

FIG. 3 shows an example of a process flow 300 that supports alternative beam failure procedures for predicted beam blockage in accordance with one or more aspects of the present disclosure. The process flow 300 may implement or be implemented by aspects of the wireless communications system 100 and the wireless communications system 200 as described with reference to FIGS. 1 and 2. For instance, in the example of FIG. 4, a network entity may be in communication with a UE 115-*b* and may be in proximity (e.g., in space) to an object 305, which may be examples of devices described herein with reference to FIG. 1 or FIG. 2. In the following description of the process flow 300, the operations between the network entity 105-*b*, the object 305, and the UE 115-*b* may be performed in a different order than the example shown, or the operations between the network entity 105-*b*, the object 305, and the UE 115-*b* may be performed in different orders at different times. Some operations may also be omitted form the process flow 300, and other operations may be added to the process flow 300.

At 310, the network entity 105-*b* may receive, from the UE 115-*b*, a first control message indicating a first beam from multiple available beams, where the first beam is for downlink communication with the UE 115-*b*. In some examples, the network entity 105-*b* may communicate with the UE 115-*b* via the first beam.

At 315, the network entity 105-*b* may transmit one or more reference signals via one or more beams. In some examples, the one or more beams may be neighboring beams to the first beam. The one or more reference signals may be reflected off of the object 305, and the network entity 105-*b* may monitor for one or more reflections of the one or more reference signals for identifying the object 305.

At 320, the network entity 105-*b* may receive one or more signals associated with an object having a trajectory that is predicted to at least partially block the first beam. In some examples, the one or more signals may be the one or more reflections of the one or more reference signals. In some examples, the trajectory of the object 305 may be predicted based on the one or more reflections of the one or more reference signals. Based on receiving the one or more signals, the network entity 105-*b* may predict a blockage of the first beam associated with the object 305.

At 325, the network entity 105-*b* may the predict a time duration that the object 305 is estimated to at least partially block the first beam. The network entity 105-*b* may predict the time duration based on the one or more reflections of the one or more reference signals. Additionally, the network entity 105-*b* may determine an adjustment to the one or more communication parameters based on the one or more reflections of the one or more reference signals.

In some examples, the adjustment to the one or more communication parameters includes a change from a first beam index of the first beam to a second beam index of a second beam that is different from the first beam. In such examples, the network entity 105-*b* may transmit one or more messages to the UE 115-*b* via the second beam. The adjustment to the one or more communication parameters may also include a change from a first MCS to a second MCS. In such examples, the network entity 105-*b* may transmit one or more messages to the UE 115-*b* in accordance with the second MCS. In some other examples, the adjustment to one or more communication parameters associated with the time duration may indicate that data transmission between the network entity 105-*b* and the UE 115-*b* is paused during at least a portion of the time duration.

At 330, the network entity 105-*b* may transmit, to the UE 115-*b*, a second control message indicating the time duration that the object is estimated to at least partially block the first beam and the adjustment to one or more communication parameters associated with the time duration. In some examples, the network entity 105-*b* may transmit the second control message via a PDCCH, a MAC-CE, or both.

At 335, the UE 115-*b* may apply the adjustment to the one or more communication parameters during the time duration. For example, the UE 115-*b* may switch from communicating using the first beam to communicating using the second beam, may switch from communicating using the first MCS to communicating using the second MCS, or both. Additionally, or alternatively, the UE 115-*b* may enter a sleep state during a remainder of the time duration subsequent to transmitting the report based on failing to receive a message from the network entity responsive to the report. Additionally, or alternatively, the UE 115-*b* may enter a sleep state during the portion of the time duration based on the second control message.

At 340, the network entity 105-*b* may transmit, during the time duration, the one or more messages to the UE 115-*b* in accordance with the adjustment to the one or more communication parameters. In some examples (e.g., where the UE 115-*b* does not indicate multiple available beams), the network entity 105-*b* may transmit a request for the UE 115-*b* to perform one or more signal measurements associated with the first beam during the time duration. In such examples, the network entity 105-*b* may transmit, via the first beam, one or more signals during the time duration. The UE 115-*b* may perform the one or more signal measurements on the one or more signals transmitted from the network entity 105-*b* during the time duration and may select the second beam for receiving the one or more messages from the network entity 105-*b* during the time duration based on the one or more signal measurements and the second control message. The UE 115-*b* may indicate the one or more signal measurements, the second beam, or both in a report to the network entity 105-*b*.

In some examples, the network entity 105-*b* may transmit, to the UE 115-*b*, an indication to stop applying the adjustment to the one or more communication parameters subsequent to transmission of the second control message. The UE 115-*b* may stop applying the adjustment to the one or more communication parameters based on the indication from the network entity 105-*b*, a configuration from the network entity 105-*b*, expiration of the time duration, or any combination thereof.

Figure 4:
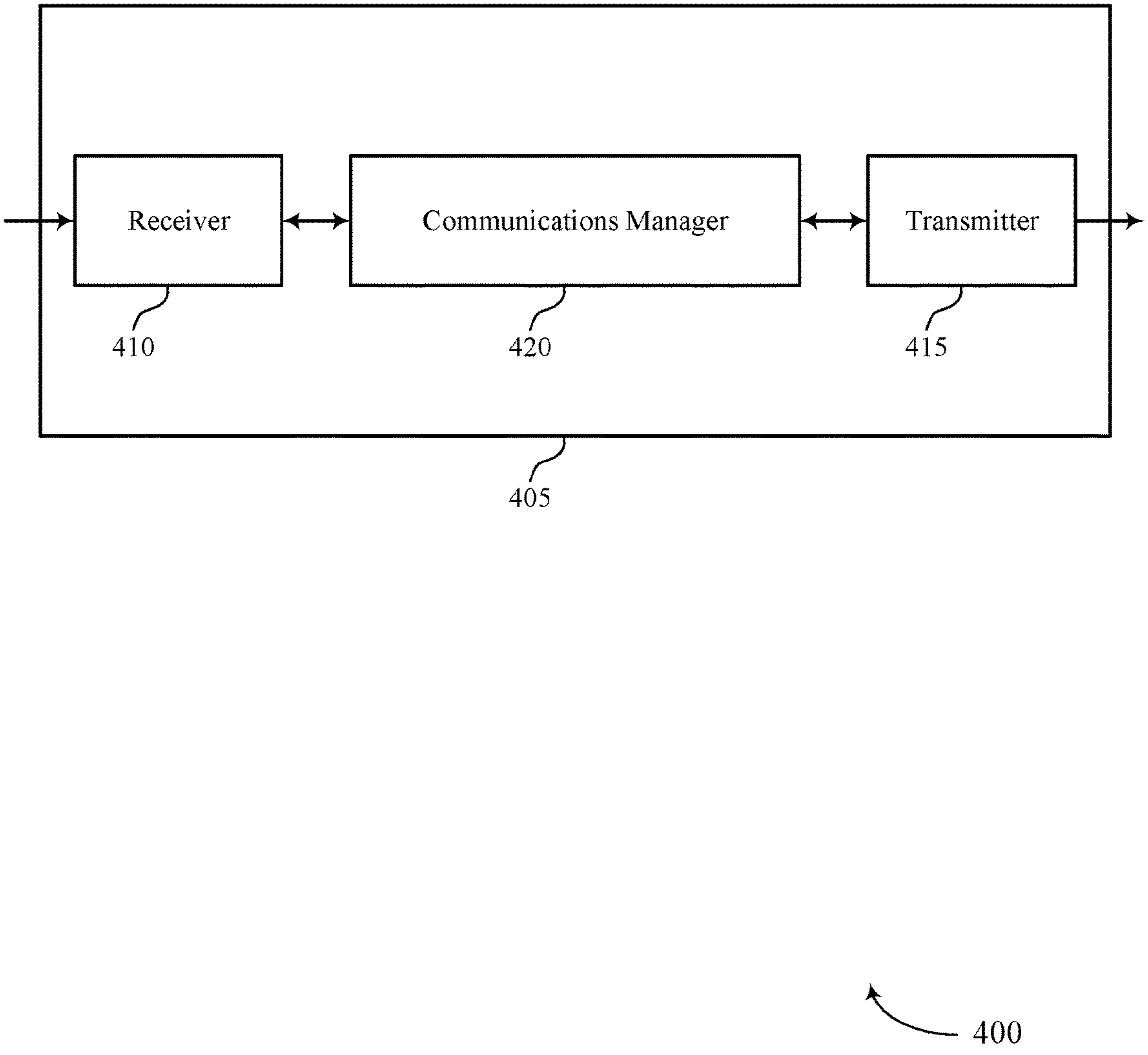
FIGS. 4 and 5 show block diagrams of devices that support alternative beam failure procedures for predicted beam blockage in accordance with one or more aspects of the present disclosure.

FIG. 4 shows a block diagram 400 of a device 405 that supports alternative beam failure procedures for predicted beam blockage in accordance with one or more aspects of the present disclosure. The device 405 may be an example of aspects of a network entity 105 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of alternative beam failure procedures for predicted beam blockage as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a DSP, a central processing unit (CPU), a graphics processing unit (GPU), a neural processing unit (NPU), an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code, software (e.g., executed by at least one processor), or any combination thereof. If implemented in code executed by at least one processor, the functions of the communications manager 420, the receiver 410, the transmitter 415, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving, from a UE, a first control message indicating a first beam from a set of multiple available beams, the first beam for downlink communication with the UE. The communications manager 420 is capable of, configured to, or operable to support a means for receiving one or more signals associated with an object having a trajectory that is predicted to at least partially block the first beam. The communications manager 420 is capable of, configured to, or operable to support a means for transmitting, to the UE, a second control message indicating a time duration that the object is estimated to at least partially block the first beam and an adjustment to one or more communication parameters associated with the time duration.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced power consumption, reduced processing, and more efficient utilization of communication resources.

Figure 5:
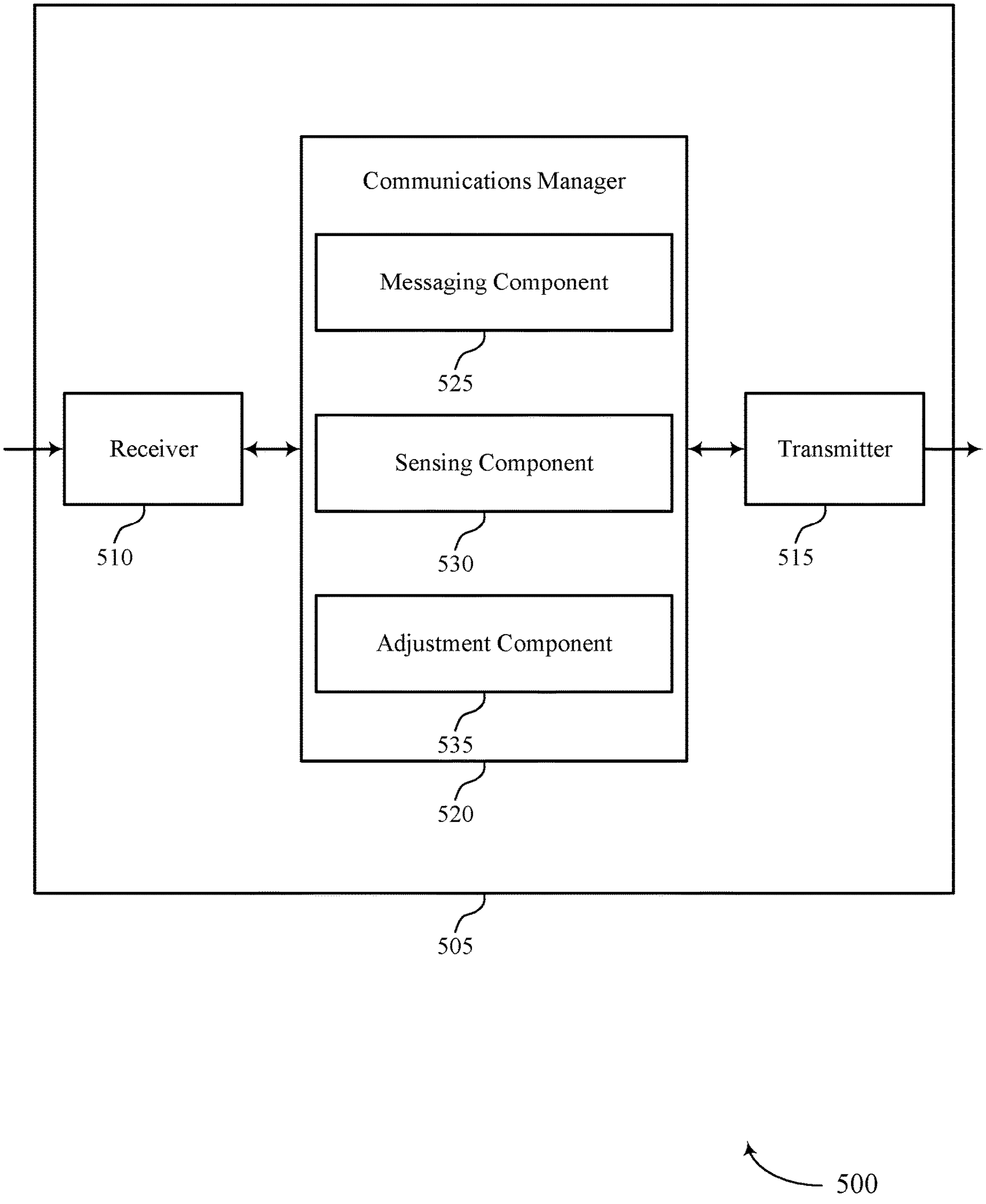

FIG. 5 shows a block diagram 500 of a device 505 that supports alternative beam failure procedures for predicted beam blockage in accordance with one or more aspects of the present disclosure. The device 505 may be an example of aspects of a device 405 or a network entity 105 as described herein. The device 505 may include a receiver 510, a transmitter 515, and a communications manager 520. The device 505, or one of more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of alternative beam failure procedures for predicted beam blockage as described herein. For example, the communications manager 520 may include a messaging component 525, a sensing component 530, an adjustment component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The messaging component 525 is capable of, configured to, or operable to support a means for receiving, from a UE, a first control message indicating a first beam from a set of multiple available beams, the first beam for downlink communication with the UE. The sensing component 530 is capable of, configured to, or operable to support a means for receiving one or more signals associated with an object having a trajectory that is predicted to at least partially block the first beam. The adjustment component 535 is capable of, configured to, or operable to support a means for transmitting, to the UE, a second control message indicating a time duration that the object is estimated to at least partially block the first beam and an adjustment to one or more communication parameters associated with the time duration.

Figure 6:
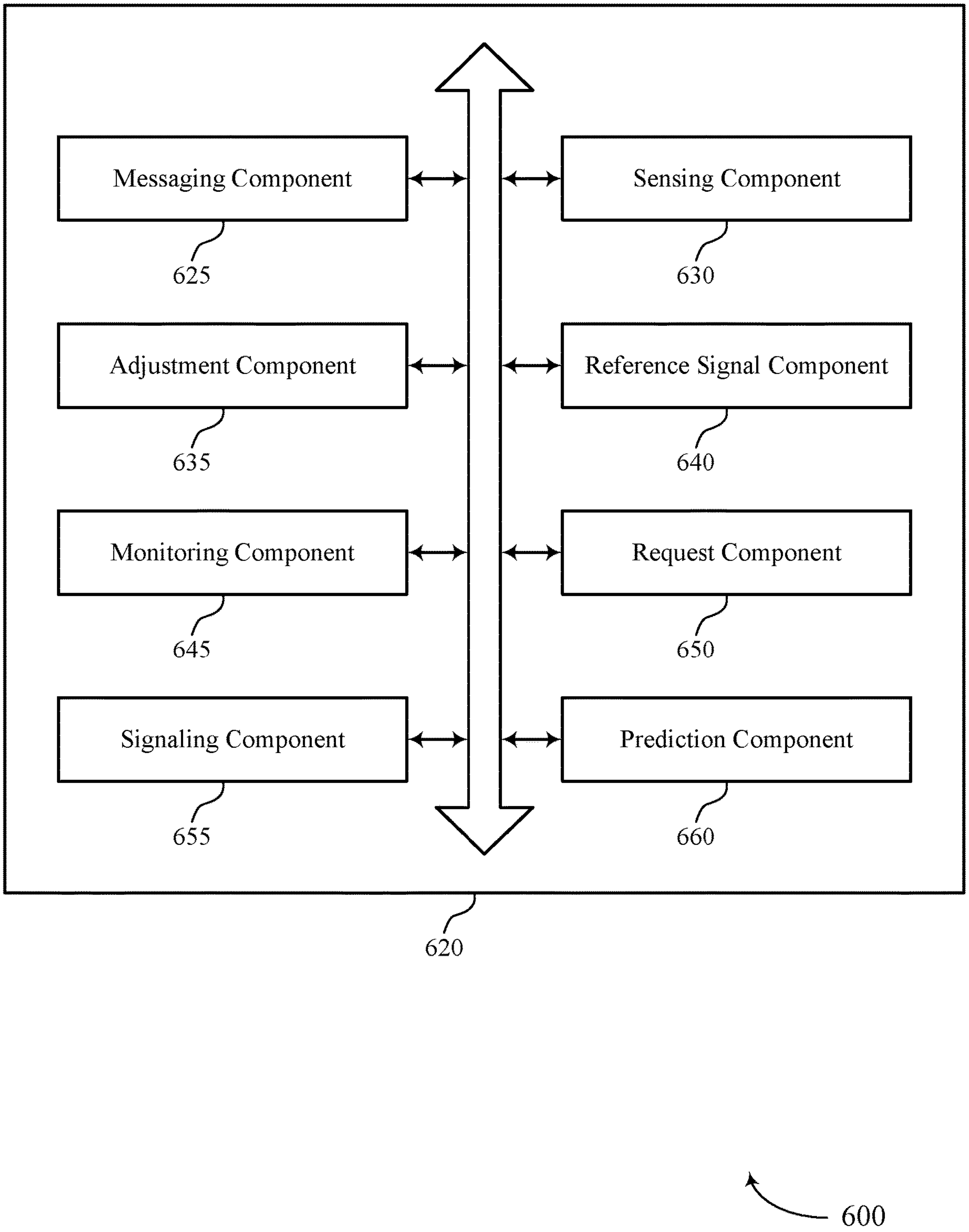
FIG. 6 shows a block diagram of a communications manager that supports alternative beam failure procedures for predicted beam blockage in accordance with one or more aspects of the present disclosure.

FIG. 6 shows a block diagram 600 of a communications manager 620 that supports alternative beam failure procedures for predicted beam blockage in accordance with one or more aspects of the present disclosure. The communications manager 620 may be an example of aspects of a communications manager 420, a communications manager 520, or both, as described herein. The communications manager 620, or various components thereof, may be an example of means for performing various aspects of alternative beam failure procedures for predicted beam blockage as described herein. For example, the communications manager 620 may include a messaging component 625, a sensing component 630, an adjustment component 635, a reference signal component 640, a monitoring component 645, a request component 650, a signaling component 655, a prediction component 660, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications in accordance with examples as disclosed herein. The messaging component 625 is capable of, configured to, or operable to support a means for receiving, from a UE, a first control message indicating a first beam from a set of multiple available beams, the first beam for downlink communication with the UE. The sensing component 630 is capable of, configured to, or operable to support a means for receiving one or more signals associated with an object having a trajectory that is predicted to at least partially block the first beam. The adjustment component 635 is capable of, configured to, or operable to support a means for transmitting, to the UE, a second control message indicating a time duration that the object is estimated to at least partially block the first beam and an adjustment to one or more communication parameters associated with the time duration.

In some examples, the messaging component 625 is capable of, configured to, or operable to support a means for transmitting, during the time duration, one or more messages to the UE in accordance with the adjustment to the one or more communication parameters.

In some examples, the adjustment to the one or more communication parameters is to change from a first beam index of the first beam to a second beam index of a second beam that is different from the first beam, and where the one or more messages are transmitted via the second beam.

In some examples, the adjustment to the one or more communication parameters is to change from a first modulation and coding scheme to a second modulation and coding scheme, and where the one or more messages are transmitted in accordance with the second modulation and coding scheme.

In some examples, the reference signal component 640 is capable of, configured to, or operable to support a means for transmitting one or more reference signals via one or more beams. In some examples, the monitoring component 645 is capable of, configured to, or operable to support a means for monitoring for one or more reflections of the one or more reference signals for identifying the object.

In some examples, the trajectory of the object is predicted based on the one or more reflections of the one or more reference signals.

In some examples, the time duration that the object is estimated to at least partially block the first beam is based on the one or more reflections of the one or more reference signals.

In some examples, the adjustment to the one or more communication parameters is based on the one or more reflections of the one or more reference signals.

In some examples, the request component 650 is capable of, configured to, or operable to support a means for transmitting a request for the UE to perform one or more signal measurements associated with the first beam during the time duration. In some examples, the signaling component 655 is capable of, configured to, or operable to support a means for transmitting, via the first beam, one or more signals during the time duration. In some examples, the signaling component 655 is capable of, configured to, or operable to support a means for receiving, from the UE, a report indicating the one or more signal measurements.

In some examples, the adjustment to one or more communication parameters associated with the time duration indicates that data transmission with the UE is paused during at least a portion of the time duration.

In some examples, the adjustment component 635 is capable of, configured to, or operable to support a means for transmitting, to the UE, an indication to stop applying the adjustment to the one or more communication parameters subsequent to transmission of the second control message.

In some examples, the messaging component 625 is capable of, configured to, or operable to support a means for transmitting the second control message via a physical downlink control channel, a medium access control-control element, or both.

Figure 7:
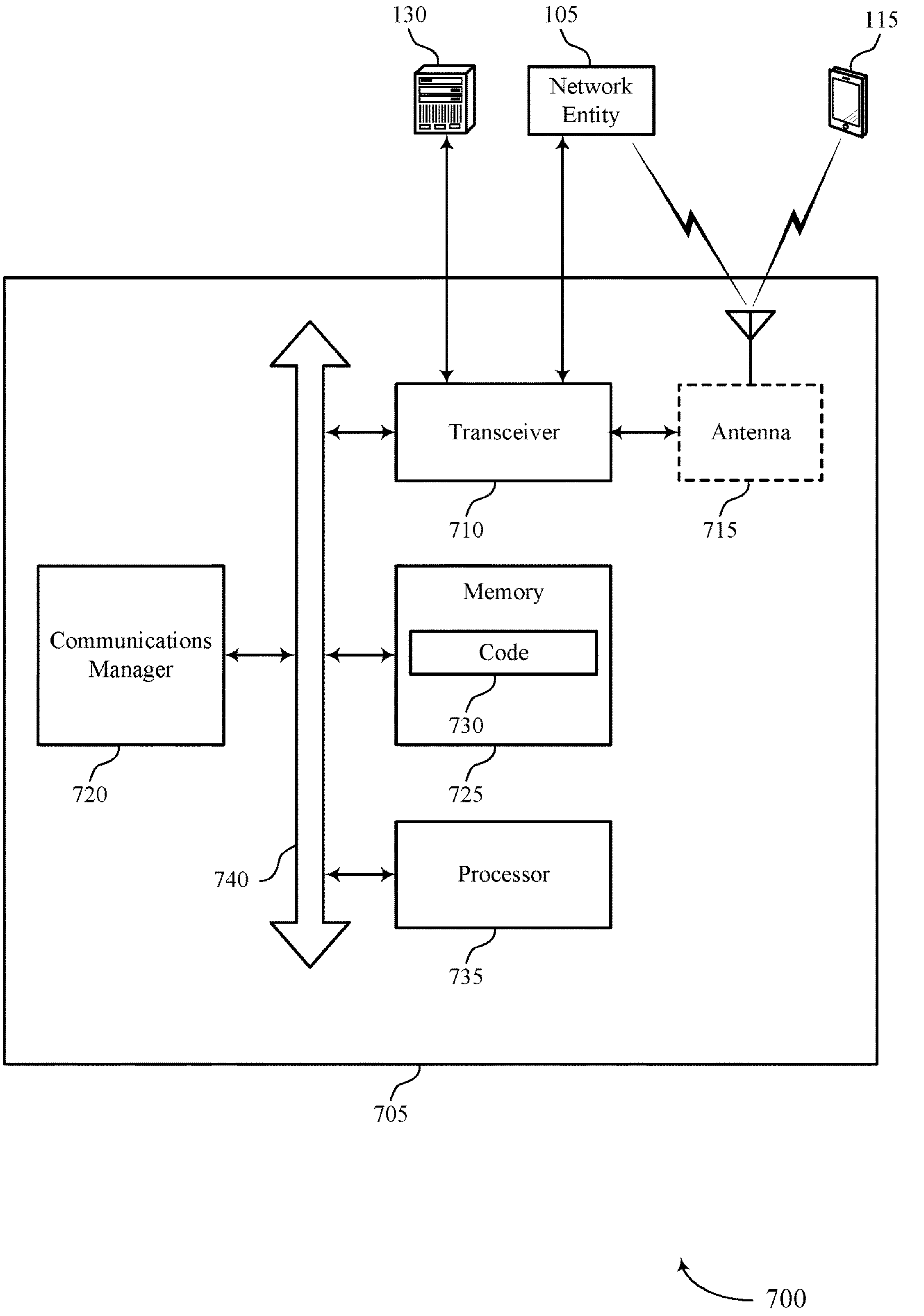
FIG. 7 shows a diagram of a system including a device that supports alternative beam failure procedures for predicted beam blockage in accordance with one or more aspects of the present disclosure.

FIG. 7 shows a diagram of a system 700 including a device 705 that supports alternative beam failure procedures for predicted beam blockage in accordance with one or more aspects of the present disclosure. The device 705 may be an example of or include the components of a device 405, a device 505, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, at least one memory 725, code 730, and at least one processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or one or more memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or one or more memory components (e.g., the at least one processor 735, the at least one memory 725, or both), may be included in a chip or chip assembly that is installed in the device 705. In some examples, the transceiver 710 may be operable to support communications via one or more communications links (e.g., a communication link 125, a backhaul communication link 120, a midhaul communication link 162, a fronthaul communication link 168).

The at least one memory 725 may include RAM, ROM, or any combination thereof. The at least one memory 725 may store computer-readable, computer-executable code 730 including instructions that, when executed by one or more of the at least one processor 735, cause the device 705 to perform various functions described herein. The code 730 may be stored in a non-transitory computer-readable medium such as system memory or another type of memory. In some cases, the code 730 may not be directly executable by a processor of the at least one processor 735 but may cause a computer (e.g., when compiled and executed) to perform functions described herein. In some cases, the at least one memory 725 may contain, among other things, a BIOS which may control basic hardware or software operation such as the interaction with peripheral components or devices. In some examples, the at least one processor 735 may include multiple processors and the at least one memory 725 may include multiple memories. One or more of the multiple processors may be coupled with one or more of the multiple memories which may, individually or collectively, be configured to perform various functions herein (for example, as part of a processing system).

The at least one processor 735 may include an intelligent hardware device (e.g., a general-purpose processor, a DSP, an ASIC, a CPU, a GPU, a NPU, an FPGA, a microcontroller, a programmable logic device, discrete gate or transistor logic, a discrete hardware component, or any combination thereof). In some cases, the at least one processor 735 may be configured to operate a memory array using a memory controller. In some other cases, a memory controller may be integrated into one or more of the at least one processor 735. The at least one processor 735 may be configured to execute computer-readable instructions stored in a memory (e.g., one or more of the at least one memory 725) to cause the device 705 to perform various functions (e.g., functions or tasks supporting alternative beam failure procedures for predicted beam blockage). For example, the device 705 or a component of the device 705 may include at least one processor 735 and at least one memory 725 coupled with one or more of the at least one processor 735, the at least one processor 735 and the at least one memory 725 configured to perform various functions described herein. The at least one processor 735 may be an example of a cloud-computing platform (e.g., one or more physical nodes and supporting software such as operating systems, virtual machines, or container instances) that may host the functions (e.g., by executing code 730) to perform the functions of the device 705. The at least one processor 735 may be any one or more suitable processors capable of executing scripts or instructions of one or more software programs stored in the device 705 (such as within one or more of the at least one memory 725). In some examples, the at least one processor 735 may include multiple processors and the at least one memory 725 may include multiple memories. One or more of the multiple processors may be coupled with one or more of the multiple memories, which may, individually or collectively, be configured to perform various functions herein. In some examples, the at least one processor 735 may be a component of a processing system, which may refer to a system (such as a series) of machines, circuitry (including, for example, one or both of processor circuitry (which may include the at least one processor 735) and memory circuitry (which may include the at least one memory 725)), or components, that receives or obtains inputs and processes the inputs to produce, generate, or obtain a set of outputs. The processing system may be configured to perform one or more of the functions described herein. As such, the at least one processor 735 or a processing system including the at least one processor 735 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 725 or otherwise, to perform one or more of the functions described herein.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the at least one memory 725, the code 730, and the at least one processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communications in accordance with examples as disclosed herein. For example, the communications manager 720 is capable of, configured to, or operable to support a means for receiving, from a UE, a first control message indicating a first beam from a set of multiple available beams, the first beam for downlink communication with the UE. The communications manager 720 is capable of, configured to, or operable to support a means for receiving one or more signals associated with an object having a trajectory that is predicted to at least partially block the first beam. The communications manager 720 is capable of, configured to, or operable to support a means for transmitting, to the UE, a second control message indicating a time duration that the object is estimated to at least partially block the first beam and an adjustment to one or more communication parameters associated with the time duration.

By including or configuring the communications manager 720 in accordance with examples as described herein, the device 705 may support techniques for reduced latency and an improved user experience related to reduced power consumption, reduced processing, and more efficient utilization of communication resources.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the transceiver 710, one or more of the at least one processor 735, one or more of the at least one memory 725, the code 730, or any combination thereof (for example, by a processing system including at least a portion of the at least one processor 735, the at least one memory 725, the code 730, or any combination thereof). For example, the code 730 may include instructions executable by one or more of the at least one processor 735 to cause the device 705 to perform various aspects of alternative beam failure procedures for predicted beam blockage as described herein, or the at least one processor 735 and the at least one memory 725 may be otherwise configured to, individually or collectively, perform or support such operations.

Figure 8:
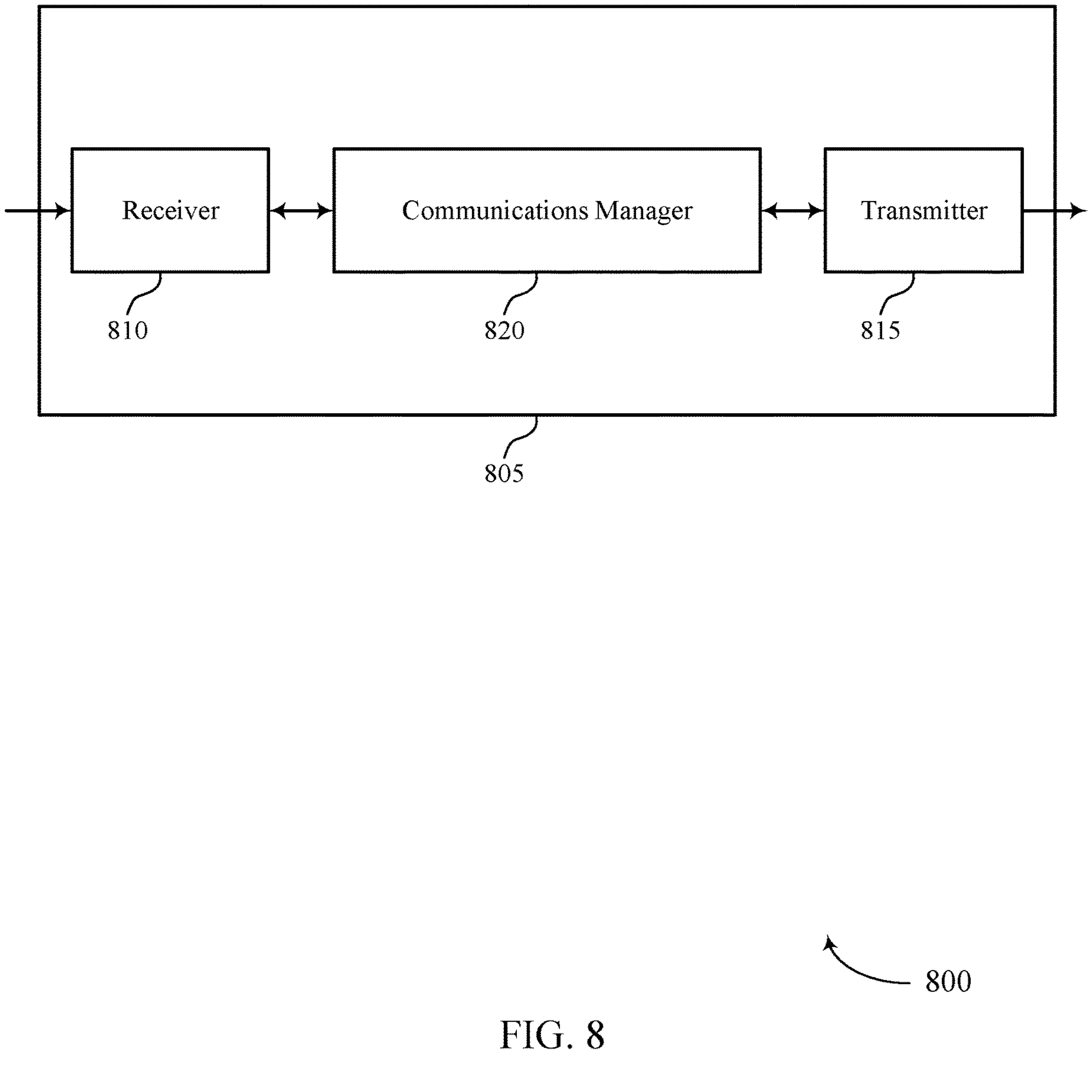
FIGS. 8 and 9 show block diagrams of devices that support alternative beam failure procedures for predicted beam blockage in accordance with one or more aspects of the present disclosure.

FIG. 8 shows a block diagram 800 of a device 805 that supports alternative beam failure procedures for predicted beam blockage in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to alternative beam failure procedures for predicted beam blockage). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to alternative beam failure procedures for predicted beam blockage). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of alternative beam failure procedures for predicted beam blockage as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code, software (e.g., executed by at least one processor) or any combination thereof. If implemented in code executed by at least one processor, the functions of the communications manager 820, the receiver 810, the transmitter 815, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting, to a network entity, a first control message indicating a first beam from a set of multiple available beams, the first beam for downlink communication with the network entity. The communications manager 820 is capable of, configured to, or operable to support a means for receiving, from the network entity, a second control message indicating a time duration that an object is estimated to at least partially block the first beam and an adjustment to one or more communication parameters associated with the time duration. The communications manager 820 is capable of, configured to, or operable to support a means for communicating with the network entity based on the second control message.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced power consumption, reduced processing, and more efficient utilization of communication resources.

Figure 9:
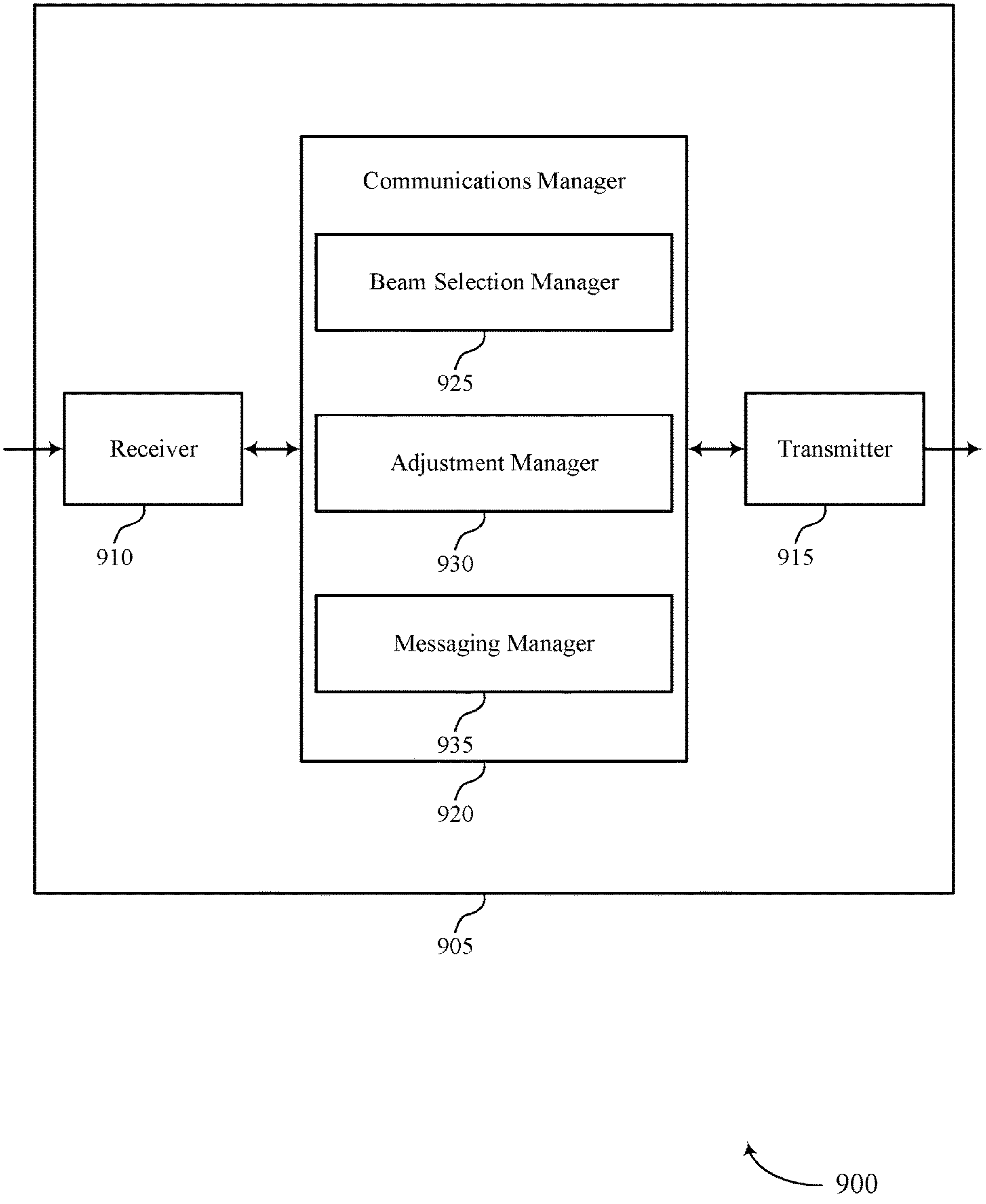

FIG. 9 shows a block diagram 900 of a device 905 that supports alternative beam failure procedures for predicted beam blockage in accordance with one or more aspects of the present disclosure. The device 905 may be an example of aspects of a device 805 or a UE 115 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to alternative beam failure procedures for predicted beam blockage). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to alternative beam failure procedures for predicted beam blockage). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of alternative beam failure procedures for predicted beam blockage as described herein. For example, the communications manager 920 may include a beam selection manager 925, an adjustment manager 930, a messaging manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The beam selection manager 925 is capable of, configured to, or operable to support a means for transmitting, to a network entity, a first control message indicating a first beam from a set of multiple available beams, the first beam for downlink communication with the network entity. The adjustment manager 930 is capable of, configured to, or operable to support a means for receiving, from the network entity, a second control message indicating a time duration that an object is estimated to at least partially block the first beam and an adjustment to one or more communication parameters associated with the time duration. The messaging manager 935 is capable of, configured to, or operable to support a means for communicating with the network entity based on the second control message.

Figure 10:
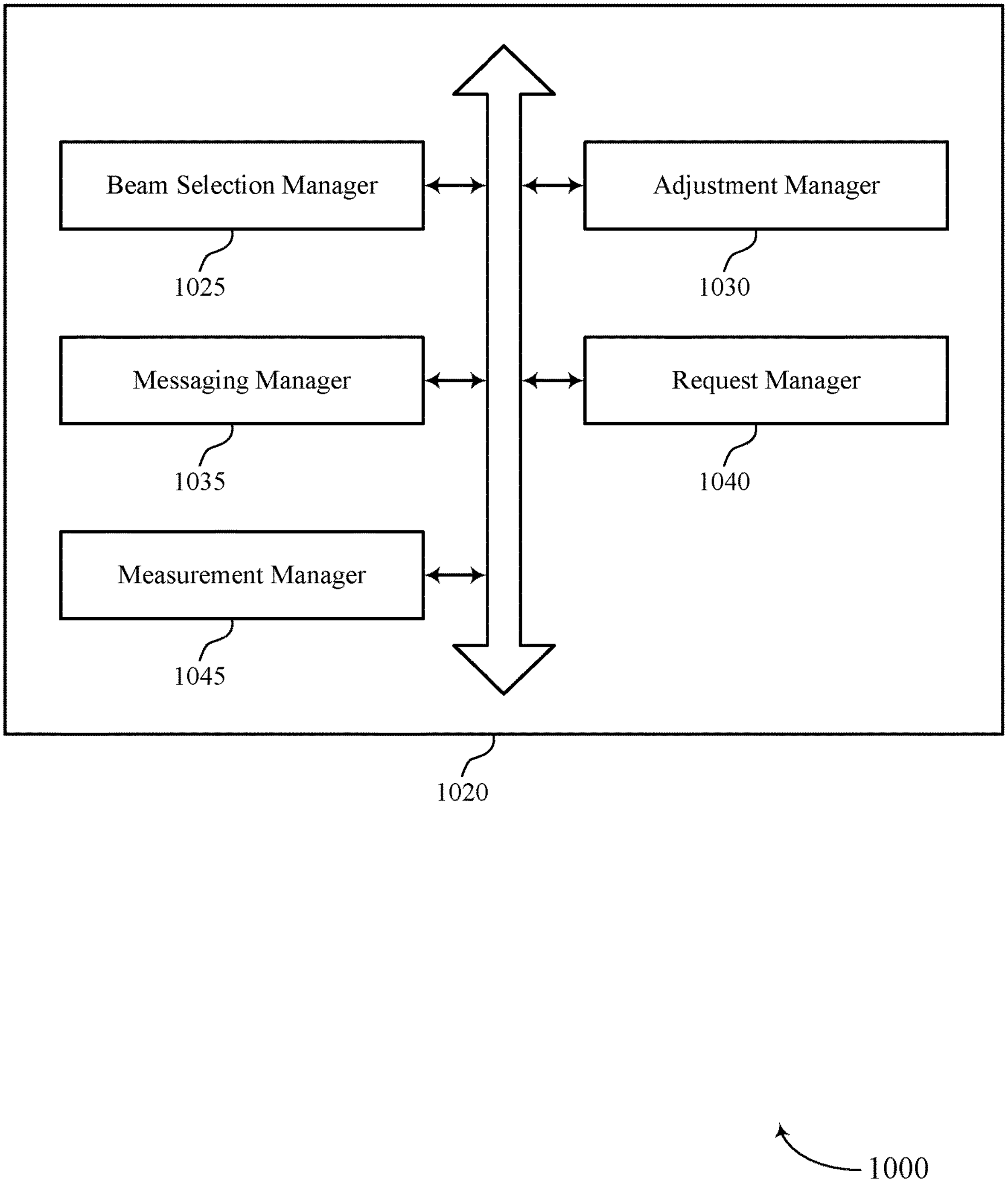
FIG. 10 shows a block diagram of a communications manager that supports alternative beam failure procedures for predicted beam blockage in accordance with one or more aspects of the present disclosure.

FIG. 10 shows a block diagram 1000 of a communications manager 1020 that supports alternative beam failure procedures for predicted beam blockage in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of alternative beam failure procedures for predicted beam blockage as described herein. For example, the communications manager 1020 may include a beam selection manager 1025, an adjustment manager 1030, a messaging manager 1035, a request manager 1040, a measurement manager 1045, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The beam selection manager 1025 is capable of, configured to, or operable to support a means for transmitting, to a network entity, a first control message indicating a first beam from a set of multiple available beams, the first beam for downlink communication with the network entity. The adjustment manager 1030 is capable of, configured to, or operable to support a means for receiving, from the network entity, a second control message indicating a time duration that an object is estimated to at least partially block the first beam and an adjustment to one or more communication parameters associated with the time duration. The messaging manager 1035 is capable of, configured to, or operable to support a means for communicating with the network entity based on the second control message.

In some examples, the adjustment manager 1030 is capable of, configured to, or operable to support a means for receiving, during the time duration, one or more messages from the network entity in accordance with the adjustment to the one or more communication parameters.

In some examples, the adjustment to the one or more communication parameters is to change from a first beam index of the first beam to a second beam index of a second beam that is different from the first beam, and where the one or more messages are received via the second beam.

In some examples, the measurement manager 1045 is capable of, configured to, or operable to support a means for performing one or more signal measurements of the set of multiple available beams. In some examples, the beam selection manager 1025 is capable of, configured to, or operable to support a means for selecting a second beam for receiving one or more messages from the network entity during the time duration based on the one or more signal measurements and the second control message.

In some examples, the adjustment to the one or more communication parameters is to change from a first modulation and coding scheme to a second modulation and coding scheme, and where the one or more messages are received in accordance with the second modulation and coding scheme.

In some examples, the adjustment manager 1030 is capable of, configured to, or operable to support a means for applying the adjustment to the one or more communication parameters during the time duration. In some examples, the adjustment manager 1030 is capable of, configured to, or operable to support a means for stopping applying the adjustment to the one or more communication parameters based on an indication from the network entity, a configuration from the network entity, expiration of the time duration, or any combination thereof.

In some examples, to support communicating with the network entity, the request manager 1040 is capable of, configured to, or operable to support a means for receiving, from the network entity, a request for the UE to perform one or more signal measurements associated with the first beam during the time duration. In some examples, to support communicating with the network entity, the measurement manager 1045 is capable of, configured to, or operable to support a means for performing the one or more signal measurements on one or more signals transmitted from the network entity during the time duration. In some examples, to support communicating with the network entity, the messaging manager 1035 is capable of, configured to, or operable to support a means for transmitting, to the network entity, a report indicating the one or more signal measurements.

In some examples, the adjustment manager 1030 is capable of, configured to, or operable to support a means for entering a sleep state during a remainder of the time duration subsequent to transmitting the report based on failing to receive a message from the network entity responsive to the report.

In some examples, the adjustment to one or more communication parameters associated with the time duration indicates that data transmission with the network entity is paused during at least a portion of the time duration.

In some examples, to support communicating with the network entity, the adjustment manager 1030 is capable of, configured to, or operable to support a means for entering a sleep state during the portion of the time duration based on the second control message.

Figure 11:
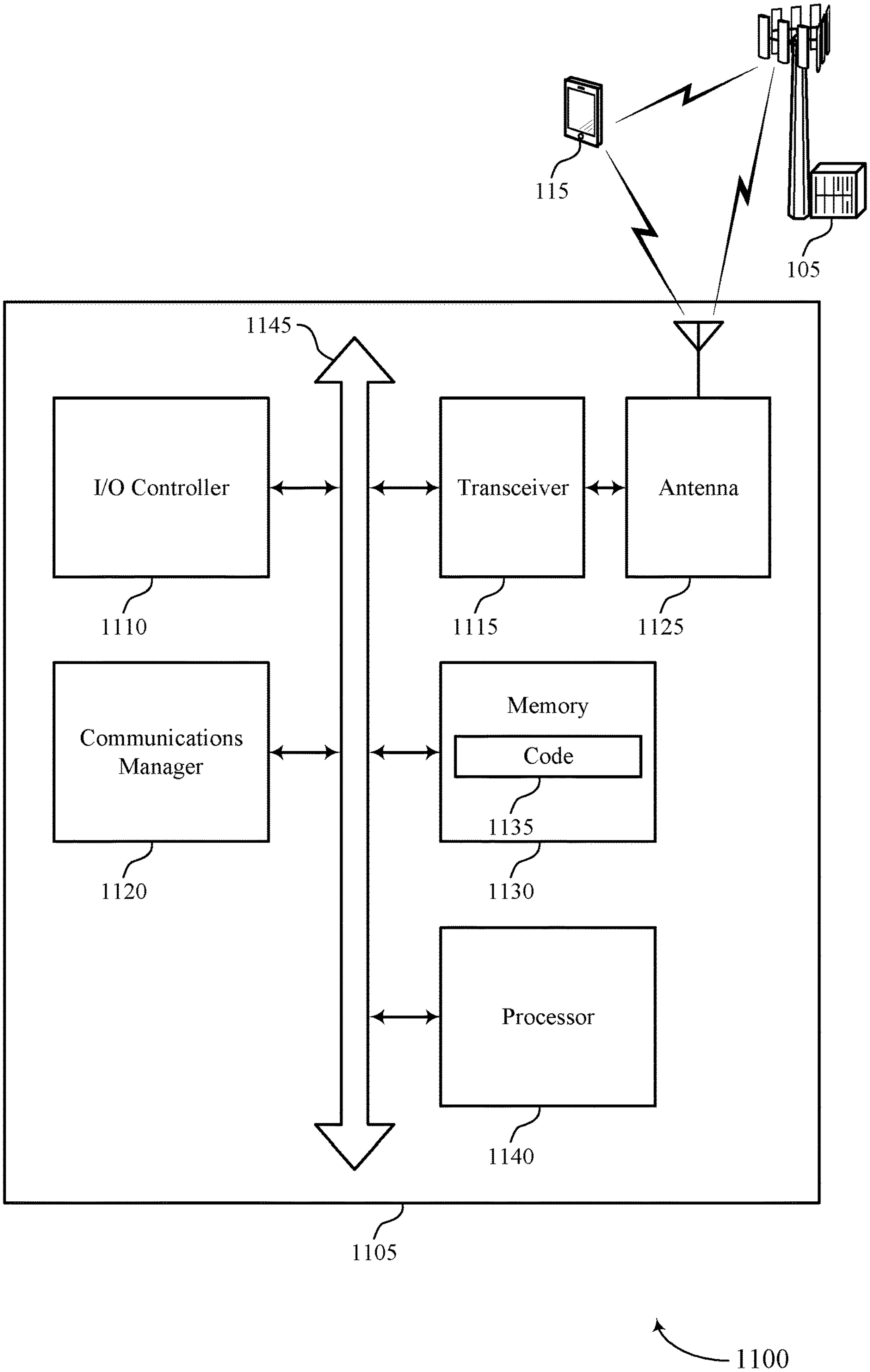
FIG. 11 shows a diagram of a system including a device that supports alternative beam failure procedures for predicted beam blockage in accordance with one or more aspects of the present disclosure.

FIG. 11 shows a diagram of a system 1100 including a device 1105 that supports alternative beam failure procedures for predicted beam blockage in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a GPU, a NPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting alternative beam failure procedures for predicted beam blockage). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for transmitting, to a network entity, a first control message indicating a first beam from a set of multiple available beams, the first beam for downlink communication with the network entity. The communications manager 1120 is capable of, configured to, or operable to support a means for receiving, from the network entity, a second control message indicating a time duration that an object is estimated to at least partially block the first beam and an adjustment to one or more communication parameters associated with the time duration. The communications manager 1120 is capable of, configured to, or operable to support a means for communicating with the network entity based on the second control message.

By including or configuring the communications manager 1120 in accordance with examples as described herein, the device 1105 may support techniques for reduced latency and improved user experience related to reduced power consumption, reduced processing, and more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of alternative beam failure procedures for predicted beam blockage as described herein, or the at least one processor 1140 and the at least one memory 1130 may be otherwise configured to, individually or collectively, perform or support such operations.

Figure 12:
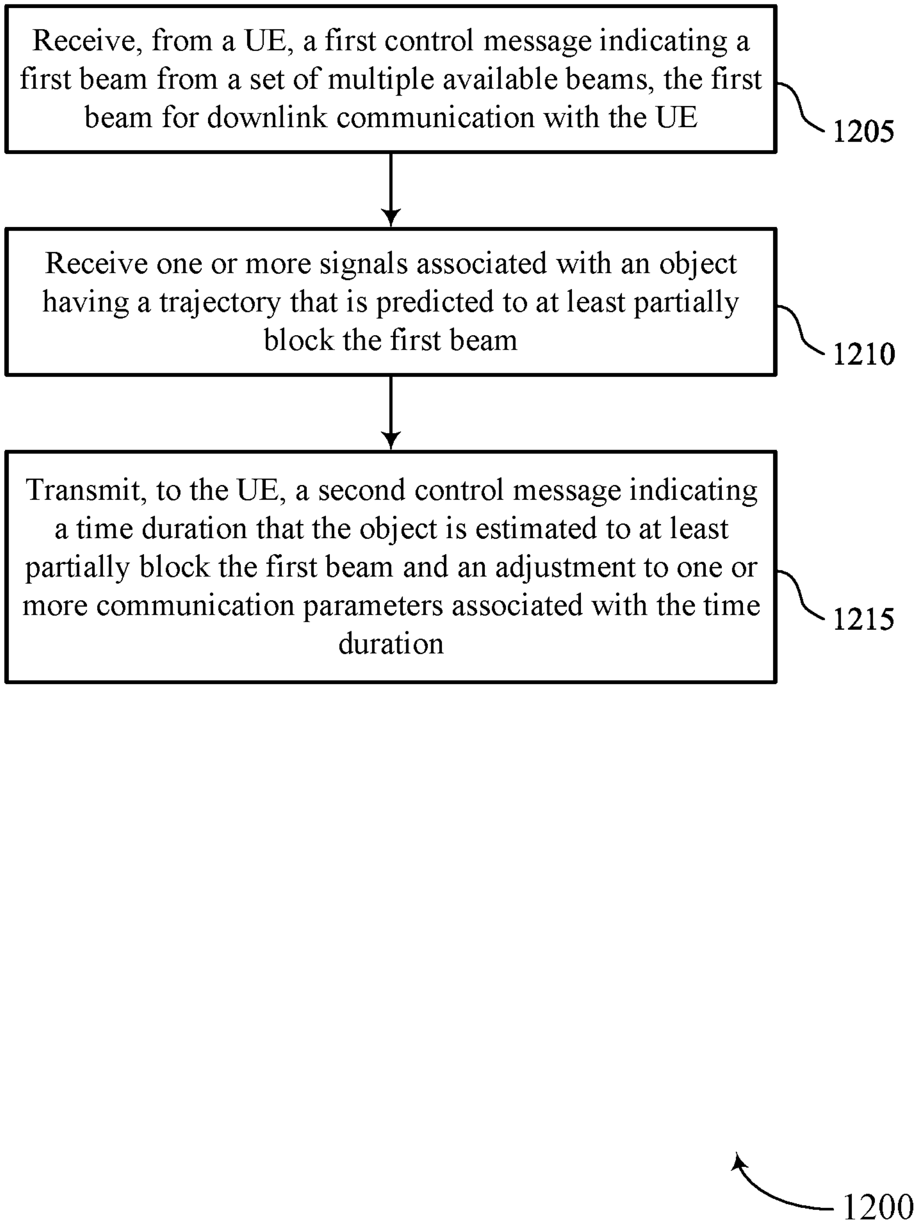
FIGS. 12 through 16 show flowcharts illustrating methods that support alternative beam failure procedures for predicted beam blockage in accordance with one or more aspects of the present disclosure.

FIG. 12 shows a flowchart illustrating a method 1200 that supports alternative beam failure procedures for predicted beam blockage in accordance with aspects of the present disclosure. The operations of the method 1200 may be implemented by a network entity or its components as described herein. For example, the operations of the method 1200 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1205, the method may include receiving, from a UE, a first control message indicating a first beam from a set of multiple available beams, the first beam for downlink communication with the UE. The operations of block 1205 may be performed in accordance with examples as disclosed herein. In some examples, aspects of the operations of 1205 may be performed by a messaging component 625 as described with reference to FIG. 6.

At 1210, the method may include receiving one or more signals associated with an object having a trajectory that is predicted to at least partially block the first beam. The operations of block 1210 may be performed in accordance with examples as disclosed herein. In some examples, aspects of the operations of 1210 may be performed by a sensing component 630 as described with reference to FIG. 6.

At 1215, the method may include transmitting, to the UE, a second control message indicating a time duration that the object is estimated to at least partially block the first beam and an adjustment to one or more communication parameters associated with the time duration. The operations of block 1215 may be performed in accordance with examples as disclosed herein. In some examples, aspects of the operations of 1215 may be performed by an adjustment component 635 as described with reference to FIG. 6.

Figure 13:
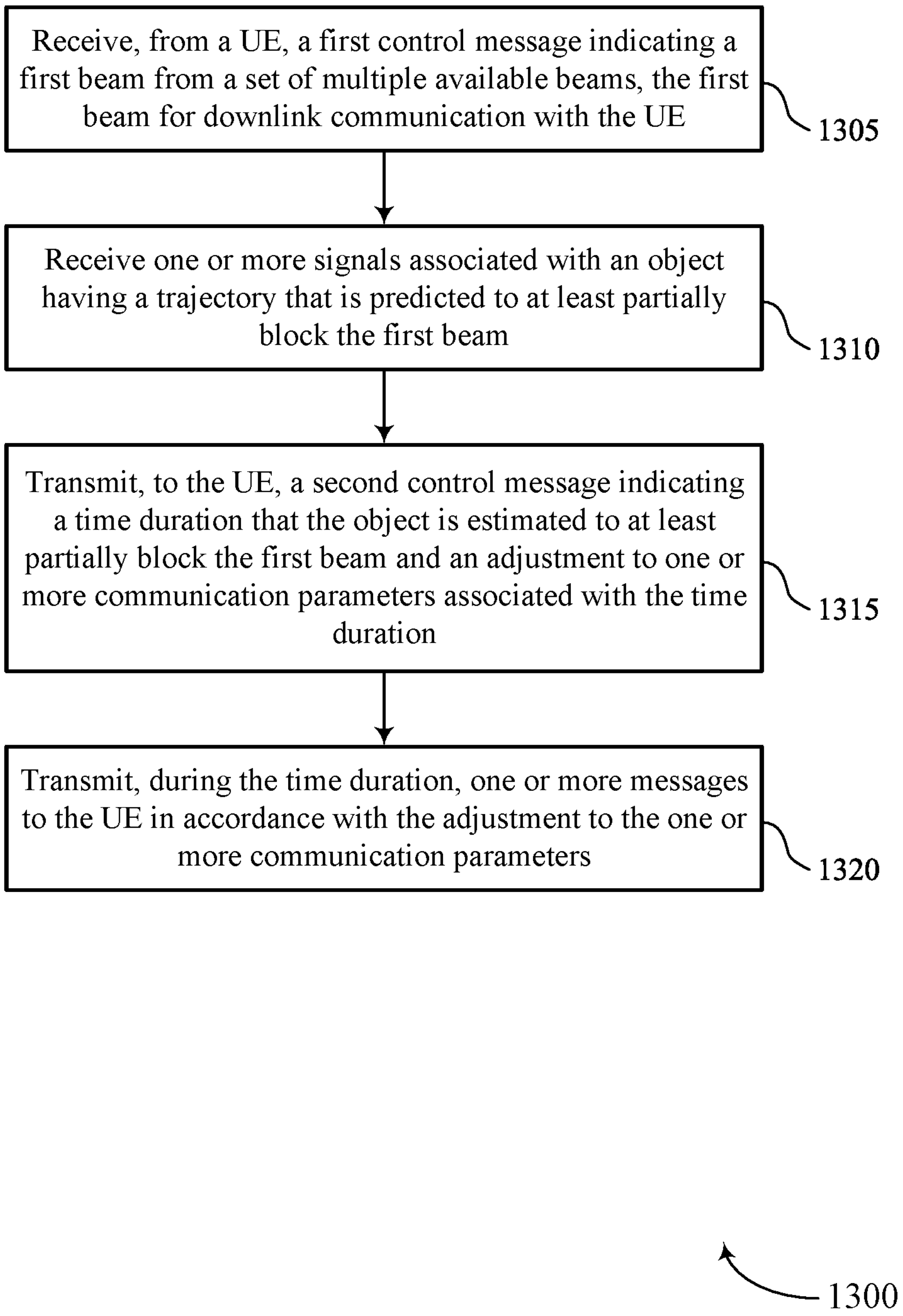

FIG. 13 shows a flowchart illustrating a method 1300 that supports alternative beam failure procedures for predicted beam blockage in accordance with aspects of the present disclosure. The operations of the method 1300 may be implemented by a network entity or its components as described herein. For example, the operations of the method 1300 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a UE, a first control message indicating a first beam from a set of multiple available beams, the first beam for downlink communication with the UE. The operations of block 1305 may be performed in accordance with examples as disclosed herein. In some examples, aspects of the operations of 1305 may be performed by a messaging component 625 as described with reference to FIG. 6.

At 1310, the method may include receiving one or more signals associated with an object having a trajectory that is predicted to at least partially block the first beam. The operations of block 1310 may be performed in accordance with examples as disclosed herein. In some examples, aspects of the operations of 1310 may be performed by a sensing component 630 as described with reference to FIG. 6.

At 1315, the method may include transmitting, to the UE, a second control message indicating a time duration that the object is estimated to at least partially block the first beam and an adjustment to one or more communication parameters associated with the time duration. The operations of block 1315 may be performed in accordance with examples as disclosed herein. In some examples, aspects of the operations of 1315 may be performed by an adjustment component 635 as described with reference to FIG. 6.

At 1320, the method may include transmitting, during the time duration, one or more messages to the UE in accordance with the adjustment to the one or more communication parameters. The operations of block 1320 may be performed in accordance with examples as disclosed herein. In some examples, aspects of the operations of 1320 may be performed by a messaging component 625 as described with reference to FIG. 6.

Figure 14:
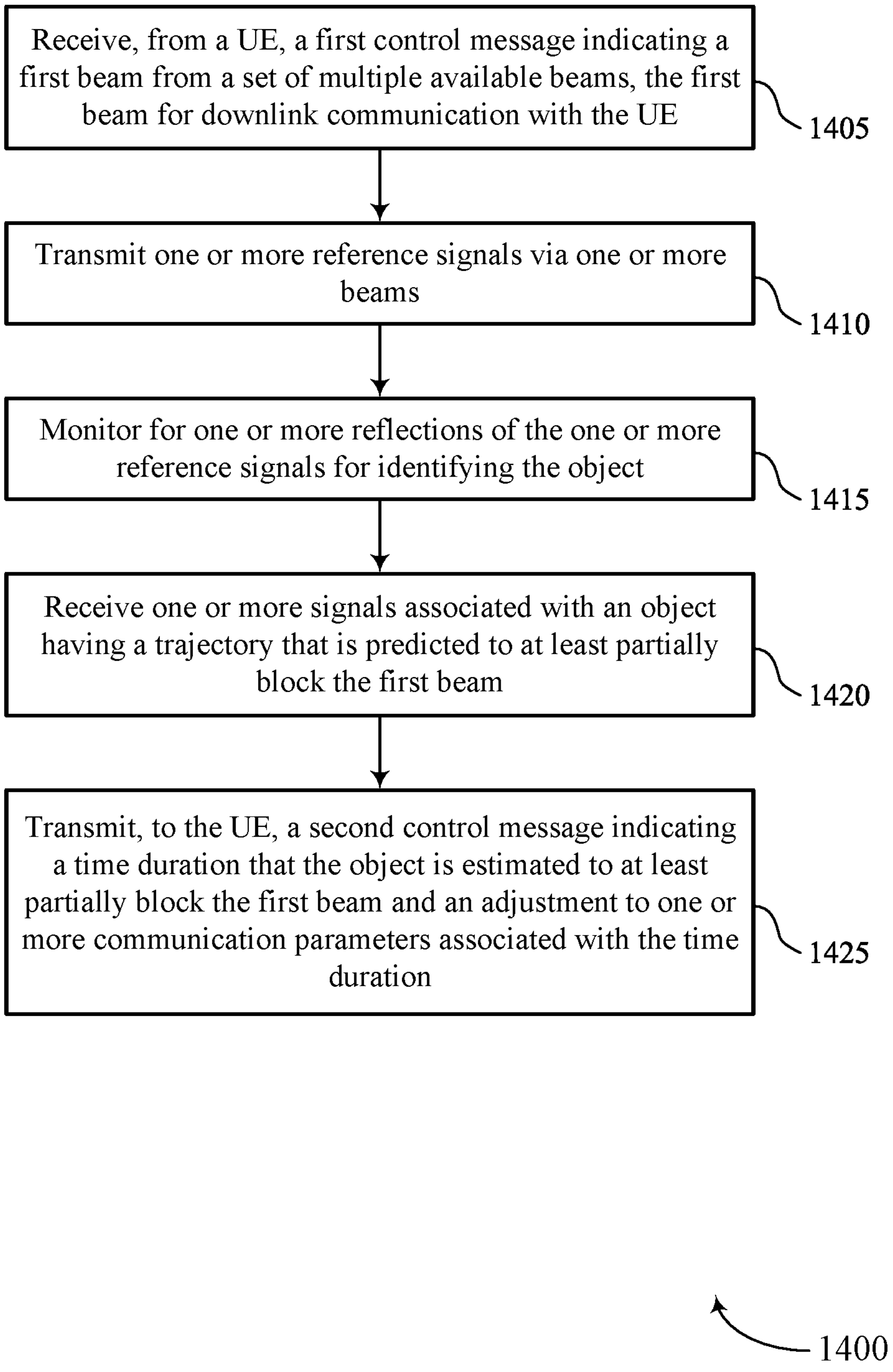

FIG. 14 shows a flowchart illustrating a method 1400 that supports alternative beam failure procedures for predicted beam blockage in accordance with aspects of the present disclosure. The operations of the method 1400 may be implemented by a network entity or its components as described herein. For example, the operations of the method 1400 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a UE, a first control message indicating a first beam from a set of multiple available beams, the first beam for downlink communication with the UE. The operations of block 1405 may be performed in accordance with examples as disclosed herein. In some examples, aspects of the operations of 1405 may be performed by a messaging component 625 as described with reference to FIG. 6.

At 1410, the method may include transmitting one or more reference signals via one or more beams. The operations of block 1410 may be performed in accordance with examples as disclosed herein. In some examples, aspects of the operations of 1410 may be performed by a reference signal component 640 as described with reference to FIG. 6.

At 1415, the method may include monitoring for one or more reflections of the one or more reference signals for identifying the object. The operations of block 1415 may be performed in accordance with examples as disclosed herein. In some examples, aspects of the operations of 1415 may be performed by a monitoring component 645 as described with reference to FIG. 6.

At 1420, the method may include receiving one or more signals associated with an object having a trajectory that is predicted to at least partially block the first beam. The operations of block 1420 may be performed in accordance with examples as disclosed herein. In some examples, aspects of the operations of 1420 may be performed by a sensing component 630 as described with reference to FIG. 6.

At 1425, the method may include transmitting, to the UE, a second control message indicating a time duration that the object is estimated to at least partially block the first beam and an adjustment to one or more communication parameters associated with the time duration. The operations of block 1425 may be performed in accordance with examples as disclosed herein. In some examples, aspects of the operations of 1425 may be performed by an adjustment component 635 as described with reference to FIG. 6.

Figure 15:
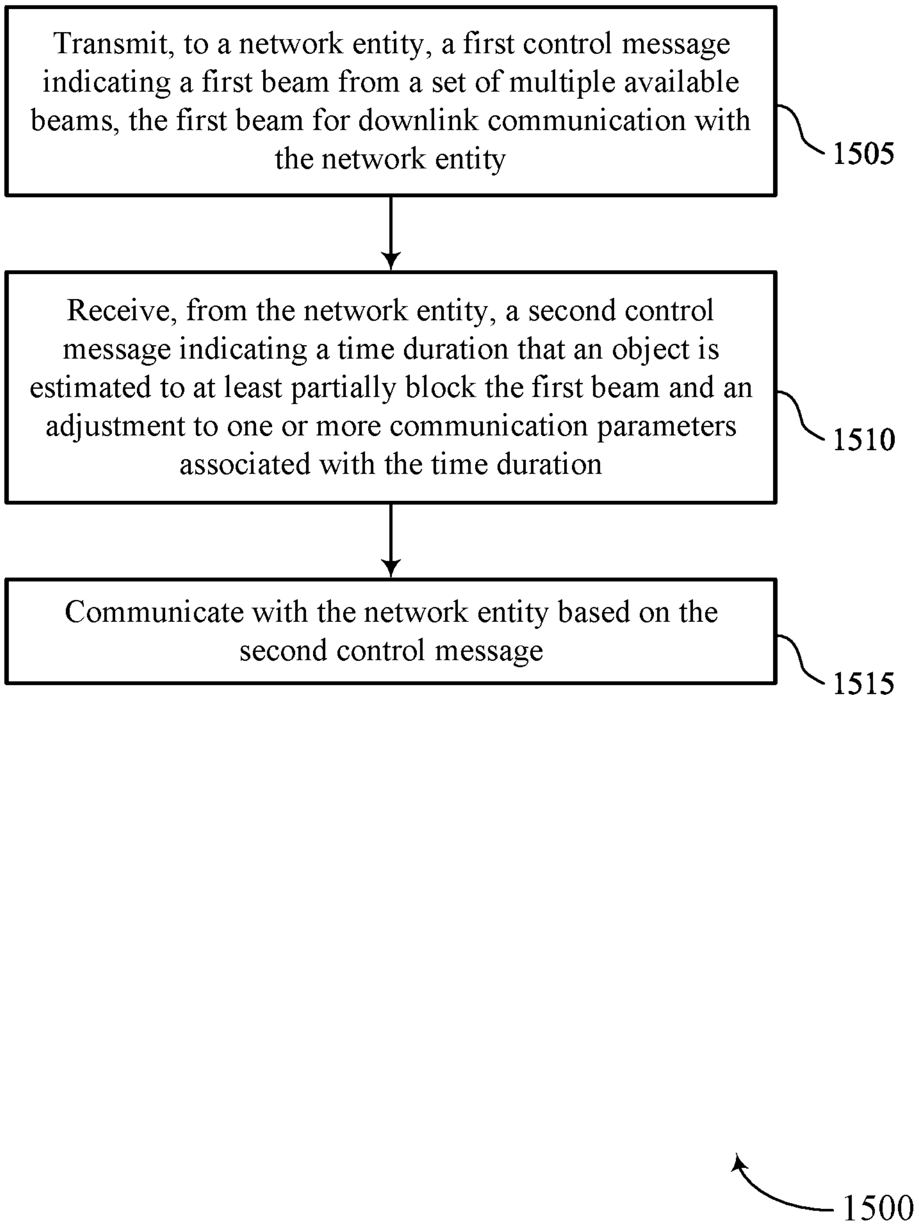

FIG. 15 shows a flowchart illustrating a method 1500 that supports alternative beam failure procedures for predicted beam blockage in accordance with aspects of the present disclosure. The operations of the method 1500 may be implemented by a UE or its components as described herein. For example, the operations of the method 1500 may be performed by a UE 115 as described with reference to FIGS. 1 through 3 and 8 through 11. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, a first control message indicating a first beam from a set of multiple available beams, the first beam for downlink communication with the network entity. The operations of block 1505 may be performed in accordance with examples as disclosed herein. In some examples, aspects of the operations of 1505 may be performed by a beam selection manager 1025 as described with reference to FIG. 10.

At 1510, the method may include receiving, from the network entity, a second control message indicating a time duration that an object is estimated to at least partially block the first beam and an adjustment to one or more communication parameters associated with the time duration. The operations of block 1510 may be performed in accordance with examples as disclosed herein. In some examples, aspects of the operations of 1510 may be performed by an adjustment manager 1030 as described with reference to FIG. 10.

At 1515, the method may include communicating with the network entity based on the second control message. The operations of block 1515 may be performed in accordance with examples as disclosed herein. In some examples, aspects of the operations of 1515 may be performed by a messaging manager 1035 as described with reference to FIG. 10.

Figure 16:
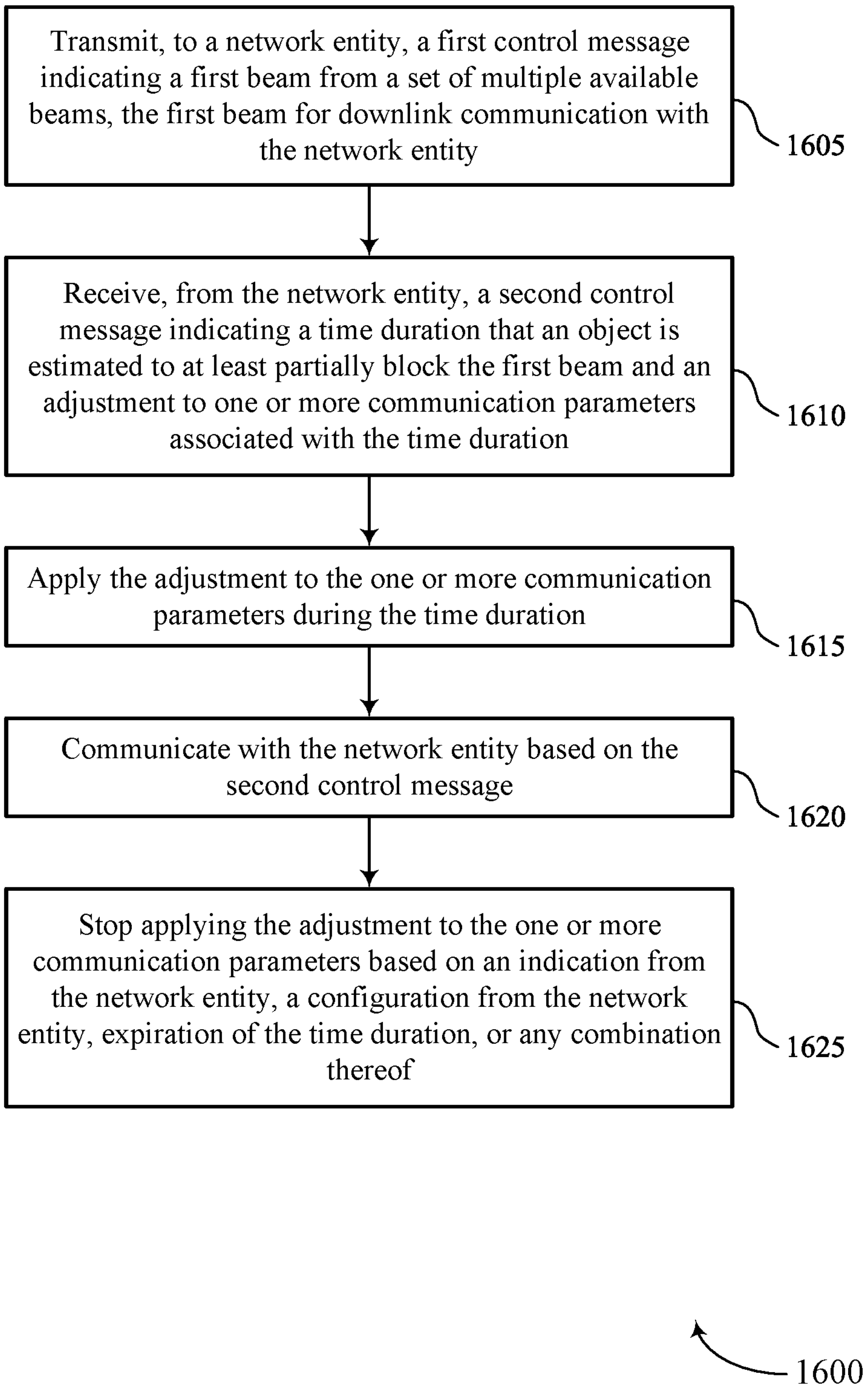

FIG. 16 shows a flowchart illustrating a method 1600 that supports alternative beam failure procedures for predicted beam blockage in accordance with aspects of the present disclosure. The operations of the method 1600 may be implemented by a UE or its components as described herein. For example, the operations of the method 1600 may be performed by a UE 115 as described with reference to FIGS. 1 through 3 and 8 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, a first control message indicating a first beam from a set of multiple available beams, the first beam for downlink communication with the network entity. The operations of block 1605 may be performed in accordance with examples as disclosed herein. In some examples, aspects of the operations of 1605 may be performed by a beam selection manager 1025 as described with reference to FIG. 10.

At 1610, the method may include receiving, from the network entity, a second control message indicating a time duration that an object is estimated to at least partially block the first beam and an adjustment to one or more communication parameters associated with the time duration. The operations of block 1610 may be performed in accordance with examples as disclosed herein. In some examples, aspects of the operations of 1610 may be performed by an adjustment manager 1030 as described with reference to FIG. 10.

At 1615, the method may include applying the adjustment to the one or more communication parameters during the time duration. The operations of block 1615 may be performed in accordance with examples as disclosed herein. In some examples, aspects of the operations of 1615 may be performed by an adjustment manager 1030 as described with reference to FIG. 10.

At 1620, the method may include communicating with the network entity based on the second control message. The operations of block 1620 may be performed in accordance with examples as disclosed herein. In some examples, aspects of the operations of 1620 may be performed by a messaging manager 1035 as described with reference to FIG. 10.

At 1625, the method may include stopping applying the adjustment to the one or more communication parameters based on an indication from the network entity, a configuration from the network entity, expiration of the time duration, or any combination thereof. The operations of block 1625 may be performed in accordance with examples as disclosed herein. In some examples, aspects of the operations of 1625 may be performed by an adjustment manager 1030 as described with reference to FIG. 10.

The following provides an overview of aspects of the present disclosure:

Aspect 1: A method for wireless communications at a network entity, comprising: receiving, from a UE, a first control message indicating a first beam from a plurality of available beams, the first beam for downlink communication with the UE; receiving one or more signals associated with an object having a trajectory that is predicted to at least partially block the first beam; and transmitting, to the UE, a second control message indicating a time duration that the object is estimated to at least partially block the first beam and an adjustment to one or more communication parameters associated with the time duration.

Aspect 2: The method of aspect 1, further comprising: transmitting, during the time duration, one or more messages to the UE in accordance with the adjustment to the one or more communication parameters.

Aspect 3: The method of aspect 2, wherein the adjustment to the one or more communication parameters is to change from a first beam index of the first beam to a second beam index of a second beam that is different from the first beam, and wherein the one or more messages are transmitted via the second beam.

Aspect 4: The method of any of aspects 2 through 3, wherein the adjustment to the one or more communication parameters is to change from a first MCS to a second MCS, and wherein the one or more messages are transmitted in accordance with the second MCS.

Aspect 5: The method of any of aspects 1 through 4, further comprising: transmitting one or more reference signals via one or more beams; and monitoring for one or more reflections of the one or more reference signals for identifying the object.

Aspect 6: The method of aspect 5, wherein the trajectory of the object is predicted based at least in part on the one or more reflections of the one or more reference signals.

Aspect 7: The method of any of aspects 5 through 6, wherein the time duration that the object is estimated to at least partially block the first beam is based at least in part on the one or more reflections of the one or more reference signals.

Aspect 8: The method of any of aspects 5 through 7, wherein the adjustment to the one or more communication parameters is based at least in part on the one or more reflections of the one or more reference signals.

Aspect 9: The method of any of aspects 1 through 8, further comprising: transmitting a request for the UE to perform one or more signal measurements associated with the first beam during the time duration; transmitting, via the first beam, one or more signals during the time duration; and receiving, from the UE, a report indicating the one or more signal measurements.

Aspect 10: The method of any of aspects 1 through 9, wherein the adjustment to one or more communication parameters associated with the time duration indicates that data transmission with the UE is paused during at least a portion of the time duration.

Aspect 11: The method of any of aspects 1 through 10, further comprising: transmitting, to the UE, an indication to stop applying the adjustment to the one or more communication parameters subsequent to transmission of the second control message.

Aspect 12: The method of any of aspects 1 through 11, further comprising: transmitting the second control message via a PDCCH, a MAC-CE, or both.

Aspect 13: A method for wireless communications at a UE, comprising: transmitting, to a network entity, a first control message indicating a first beam from a plurality of available beams, the first beam for downlink communication with the network entity; receiving, from the network entity, a second control message indicating a time duration that an object is estimated to at least partially block the first beam and an adjustment to one or more communication parameters associated with the time duration; and communicating with the network entity based at least in part on the second control message.

Aspect 14: The method of aspect 13, further comprising: receiving, during the time duration, one or more messages from the network entity in accordance with the adjustment to the one or more communication parameters.

Aspect 15: The method of aspect 14, wherein the adjustment to the one or more communication parameters is to change from a first beam index of the first beam to a second beam index of a second beam that is different from the first beam, and wherein the one or more messages are received via the second beam.

Aspect 16: The method of aspect 15, further comprising: performing one or more signal measurements of the plurality of available beams; and selecting a second beam for receiving one or more messages from the network entity during the time duration based at least in part on the one or more signal measurements and the second control message.

Aspect 17: The method of any of aspects 14 through 16, wherein the adjustment to the one or more communication parameters is to change from a first MCS to a second MCS, and wherein the one or more messages are received in accordance with the second MCS.

Aspect 18: The method of any of aspects 13 through 17, further comprising: applying the adjustment to the one or more communication parameters during the time duration; and stopping applying the adjustment to the one or more communication parameters based at least in part on an indication from the network entity, a configuration from the network entity, expiration of the time duration, or any combination thereof.

Aspect 19: The method of any of aspects 13 through 18, wherein communicating with the network entity further comprises: receiving, from the network entity, a request for the UE to perform one or more signal measurements associated with the first beam during the time duration; performing the one or more signal measurements on one or more signals transmitted from the network entity during the time duration; and transmitting, to the network entity, a report indicating the one or more signal measurements.

Aspect 20: The method of aspect 19, further comprising: entering a sleep state during a remainder of the time duration subsequent to transmitting the report based at least in part on failing to receive a message from the network entity responsive to the report.

Aspect 21: The method of any of aspects 13 through 20, wherein the adjustment to one or more communication parameters associated with the time duration indicates that data transmission with the network entity is paused during at least a portion of the time duration.

Aspect 22: The method of aspect 21, wherein communicating with the network entity further comprises: entering a sleep state during the portion of the time duration based at least in part on the second control message.

Aspect 23: A network entity for wireless communications, comprising one or more memories storing processor-executable code, and one or more processors coupled with the one or more memories and individually or collectively operable to execute the code (e.g., directly, indirectly, after pre-processing, without pre-processing) to cause the network entity to perform a method of any of aspects 1 through 12.

Aspect 24: A network entity for wireless communications, comprising at least one means for performing a method of any of aspects 1 through 12.

Aspect 25: A non-transitory computer-readable medium storing code for wireless communications, the code comprising instructions executable by a processor (e.g., directly, indirectly, after pre-processing, without pre-processing) to perform a method of any of aspects 1 through 12.

Aspect 26: A UE for wireless communications, comprising one or more memories storing processor-executable code, and one or more processors coupled with the one or more memories and individually or collectively operable to execute the code (e.g., directly, indirectly, after pre-processing, without pre-processing) to cause the UE to perform a method of any of aspects 13 through 22.

Aspect 27: A UE for wireless communications, comprising at least one means for performing a method of any of aspects 13 through 22.

Aspect 28: A non-transitory computer-readable medium storing code for wireless communications, the code comprising instructions executable by a processor (e.g., directly, indirectly, after pre-processing, without pre-processing) to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, a NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify." or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:

one or more memories storing processor-executable code; and one or more processors coupled with the one or more memories and individually or collectively operable to execute the code to cause the network entity to:

receive, from a user equipment (UE), a first control message indicating a first beam from a plurality of available beams, the first beam for downlink communication with the UE;

receive one or more signals associated with an object having a trajectory that is predicted to at least partially block the first beam, wherein the trajectory is predicted based at least in part on one or more reference signal transmissions via one or more beams of the plurality of available beams other than the first beam; and transmit, to the UE, a second control message indicating a time duration that the object is estimated to at least partially block the first beam and an adjustment to one or more communication parameters associated with the time duration.

2. The network entity of claim 1, wherein the one or more processors are individually or collectively further operable to execute the code to cause the network entity to:

transmit, during the time duration, one or more messages to the UE in accordance with the adjustment to the one or more communication parameters.

3. The network entity of claim 2, wherein the adjustment to the one or more communication parameters is to change from a first beam index of the first beam to a second beam index of a second beam that is different from the first beam, and wherein the one or more messages are transmitted via the second beam.

4. The network entity of claim 2, wherein the adjustment to the one or more communication parameters is to change from a first modulation and coding scheme to a second modulation and coding scheme, and wherein the one or more messages are transmitted in accordance with the second modulation and coding scheme.

5. The network entity of claim 1, wherein the one or more processors are individually or collectively further operable to execute the code to cause the network entity to:

transmit one or more reference signals via the one or more beams of the plurality of available beams other than the first beam; and monitor for one or more reflections of the one or more reference signals for identifying the object.

6. The network entity of claim 5, wherein the trajectory of the object is predicted based at least in part on the one or more reflections of the one or more reference signals.

7. The network entity of claim 5, wherein the time duration that the object is estimated to at least partially block the first beam is based at least in part on the one or more reflections of the one or more reference signals.

8. The network entity of claim 5, wherein the adjustment to the one or more communication parameters is based at least in part on the one or more reflections of the one or more reference signals.

9. The network entity of claim 1, wherein the one or more processors are individually or collectively further operable to execute the code to cause the network entity to:

transmit a request for the UE to perform one or more signal measurements associated with the first beam during the time duration;

transmit, via the first beam, one or more signals during the time duration; and receive, from the UE, a report indicating the one or more signal measurements.

10. The network entity of claim 1, wherein the adjustment to the one or more communication parameters associated with the time duration indicates that data transmission with the UE is paused during at least a portion of the time duration.

11. The network entity of claim 1, wherein the one or more processors are individually or collectively further operable to execute the code to cause the network entity to:

transmit, to the UE, an indication to stop applying the adjustment to the one or more communication parameters subsequent to transmission of the second control message.

12. The network entity of claim 1, wherein the one or more processors are individually or collectively further operable to execute the code to cause the network entity to:

transmit the second control message via a physical downlink control channel, a medium access control-control element, or both.

13. A method for wireless communications at a network entity, comprising:

receiving, from a user equipment (UE), a first control message indicating a first beam from a plurality of available beams, the first beam for downlink communication with the UE;

receiving one or more signals associated with an object having a trajectory that is predicted to at least partially block the first beam, wherein the trajectory is predicted based at least in part on one or more reference signal transmissions via one or more beams of the plurality of available beams other than the first beam; and transmitting, to the UE, a second control message indicating a time duration that the object is estimated to at least partially block the first beam and an adjustment to one or more communication parameters associated with the time duration.

14. The method of claim 13, further comprising:

transmitting, during the time duration, one or more messages to the UE in accordance with the adjustment to the one or more communication parameters.

15. The method of claim 14, wherein the adjustment to the one or more communication parameters is to change from a first beam index of the first beam to a second beam index of a second beam that is different from the first beam, and wherein the one or more messages are transmitted via the second beam.

16. The method of claim 14, wherein the adjustment to the one or more communication parameters is to change from a first modulation and coding scheme to a second modulation and coding scheme, and wherein the one or more messages are transmitted in accordance with the second modulation and coding scheme.

17. The method of claim 13, further comprising:

transmitting one or more reference signals via the one or more beams of the plurality of available beams other than the first beam; and monitoring for one or more reflections of the one or more reference signals for identifying the object.

18. The method of claim 17, wherein the trajectory of the object is predicted based at least in part on the one or more reflections of the one or more reference signals.

19. The method of claim 17, wherein the time duration that the object is estimated to at least partially block the first beam is based at least in part on the one or more reflections of the one or more reference signals.

20. The method of claim 17, wherein the adjustment to the one or more communication parameters is based at least in part on the one or more reflections of the one or more reference signals.

21. The method of claim 13, further comprising:

transmitting a request for the UE to perform one or more signal measurements associated with the first beam during the time duration;

transmitting, via the first beam, one or more signals during the time duration; and receiving, from the UE, a report indicating the one or more signal measurements.

22. The method of claim 13, wherein the adjustment to the one or more communication parameters associated with the time duration indicates that data transmission with the UE is paused during at least a portion of the time duration.

23. The method of claim 13, further comprising:

transmitting, to the UE, an indication to stop applying the adjustment to the one or more communication parameters subsequent to transmission of the second control message.

24. The method of claim 13, further comprising:

transmitting the second control message via a physical downlink control channel, a medium access control-control element, or both.

25. A network entity, comprising:

means for receiving a first control message indicating a first beam from a plurality of available beams, the first beam for downlink communication with a user equipment (UE);

means for receiving one or more signals associated with an object having a trajectory that is predicted to at least partially block the first beam, wherein the trajectory is predicted based at least in part on one or more reference signal transmissions via one or more beams of the plurality of available beams other than the first beam; and means for transmitting, to the UE, a second control message indicating a time duration that the object is estimated to at least partially block the first beam and an adjustment to one or more communication parameters associated with the time duration.

26. The network entity of claim 25, further comprising:

means for transmitting, during the time duration, one or more messages to the UE in accordance with the adjustment to the one or more communication parameters.

27. The network entity of claim 26, wherein the adjustment to the one or more communication parameters is to change from a first beam index of the first beam to a second beam index of a second beam that is different from the first beam, and wherein the one or more messages are transmitted via the second beam.

28. The network entity of claim 26, wherein the adjustment to the one or more communication parameters is to change from a first modulation and coding scheme to a second modulation and coding scheme, and wherein the one or more messages are transmitted in accordance with the second modulation and coding scheme.

29. A non-transitory computer-readable medium storing code for wireless communication, the code comprising instructions executable by one or more processors to:

receive, from a user equipment (UE), a first control message indicating a first beam from a plurality of available beams, the first beam for downlink communication with the UE;

receive one or more signals associated with an object having a trajectory that is predicted to at least partially block the first beam, wherein the trajectory is predicted based at least in part on one or more reference signal transmissions via one or more beams of the plurality of available beams other than the first beam; and transmit, to the UE, a second control message indicating a time duration that the object is estimated to at least partially block the first beam and an adjustment to one or more communication parameters associated with the time duration.

30. The non-transitory computer-readable medium of claim 29, wherein the instructions are further executable by the one or more processors to:

transmit, during the time duration, one or more messages to the UE in accordance with the adjustment to the one or more communication parameters.

* * * * *